United States Patent
Fan et al.

[11] Patent Number: 6,141,367
[45] Date of Patent: Oct. 31, 2000

[54] SOLID STATE DYE LASER

[75] Inventors: Bunsen Fan, Peekskill; Sadeg Mustafa Faris, Pleasantville, both of N.Y.

[73] Assignee: Reveo, Inc., Hawthorne, N.Y.

[21] Appl. No.: 09/045,307

[22] Filed: Mar. 20, 1998

[51] Int. Cl.$^7$ ...................................................... H01S 3/20
[52] U.S. Cl. .............................................. 372/53; 372/96
[58] Field of Search ................................. 372/39, 53, 23, 372/7, 68, 96, 105

[56] References Cited

U.S. PATENT DOCUMENTS 3,771,065  11/1973  Goldberg et al. .
4,523,319  6/1985  Pfost ........................................... 372/54

FOREIGN PATENT DOCUMENTS

WO 95/17692  12/1994  WIPO .

OTHER PUBLICATIONS

C. V. Shank, J. E. Bjorkholm and H. Kogelnik, 'Tunable distributed–feedback dye laser,' *Applied Physics Letters*, 18, 395 (1971).

I. P. Il'chishin et al, 'Detecting of the structure distortion of cholesteric liquid crystal using the generation characteristics of the distributed feedback laser based on it,' *Molecular Crystals and Liquid Crystals*, 265, 687 (1995).

I. P. Il'chishin et al, 'Generation of a tunable radiation by impurity cholesteric liquid crystals,' *JETP Letters*, 32, 24 (1980).

B. Fan and T. K. Gustafson, 'Narrow–band picosecond pulses from an ultrashort–cavity dye laser,' *Applied Physics Letters*, 28, 202 (1976).

J.–C. Lee and S. D. Jacobs, 'Design and construction of 1064–nm liquid–crystal laser cavity end mirrors,' *Journal of Applied Physics*, 68, 6523 (1990).

J. L. Fergason, 'Cholesteric Structure—I. Optical Properties,' *Molecular Crystals*, 1, 293 (1966).

R. Maurer, D. Andrejewski, F. H. Kreuzer and A. Miller, 'Polarizing color filters made from cholesteric LC silicones,' SID 90 Digest, 110 (1990).

R. B. Meyer, F. Lonberg and C.–C. Chang, 'Liquid crystal smart reflectors,' *Proceedings of SPIE*, 2441, 68(1995).

W. V. Smith, *Laser Applications*, (Artech House, Inc., Dedham., MA, 1970). (pp. 112 to 121).

M. Mansuripur, *The Physical Principles of Magneto–optical Recording*, Cambridge University Press, 1995, (pp. 264–273).

*Primary Examiner*—Teresa M. Arroyo
*Assistant Examiner*—Gioacchino Inzirillo
*Attorney, Agent, or Firm*—Sampson & Associates

[57] ABSTRACT

A solid state dye laser is adapted for use in a solid state dye laser assembly having a pump adapted to emit light at a first frequency and intensity. The solid state dye laser includes an elongated web of polymeric host material having a gain medium disposed therein, the gain medium being in a substantially solid state and doped with a fluorescent dye adapted to emit light within a predetermined spectral tuning range. The gain medium includes polymeric cholesteric liquid crystal disposed in a planar texture and frozen into a characteristic wavelength. The solid state dye laser, including the gain medium, is adapted for convenient movement relative to the pump.

64 Claims, 21 Drawing Sheets

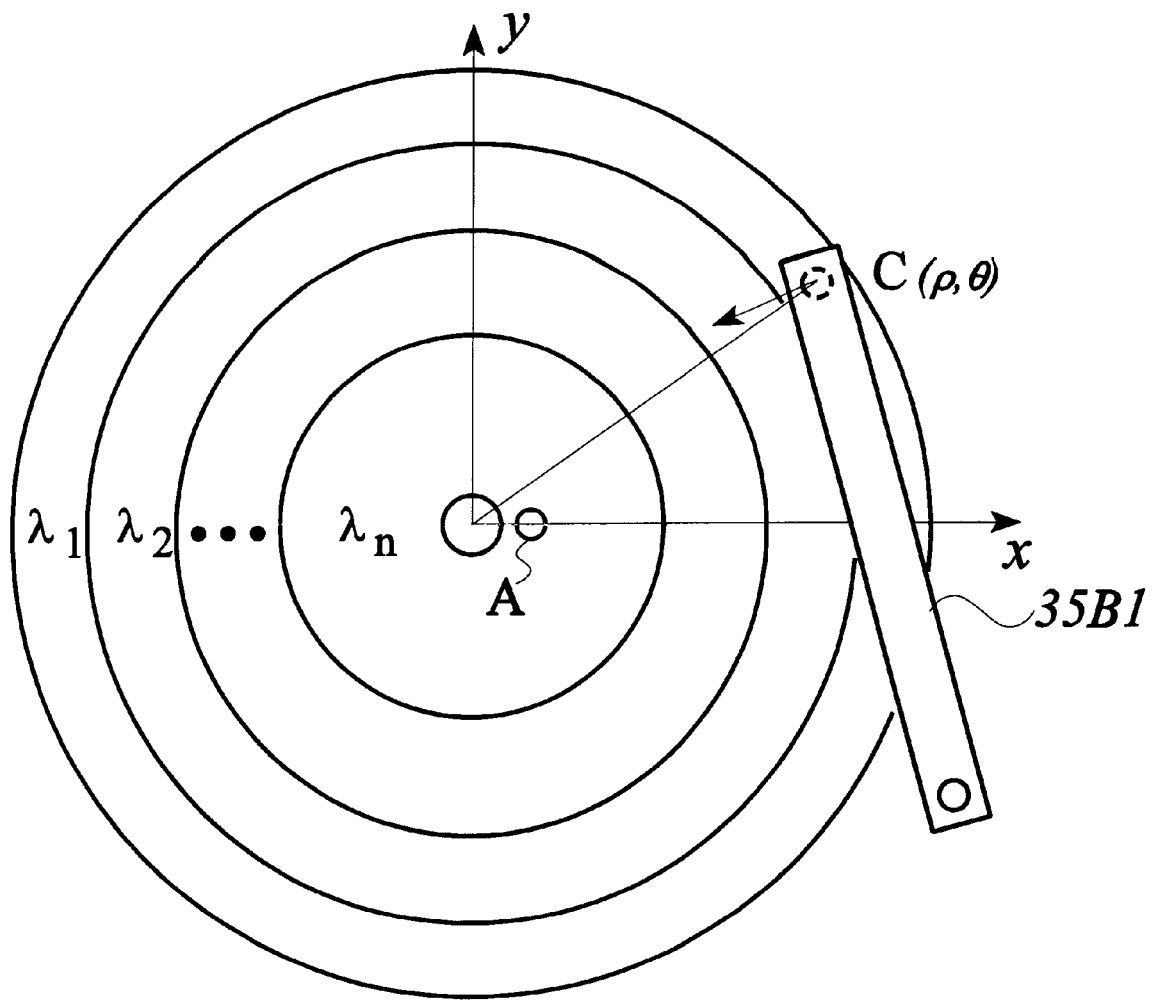
Fig. 3B1

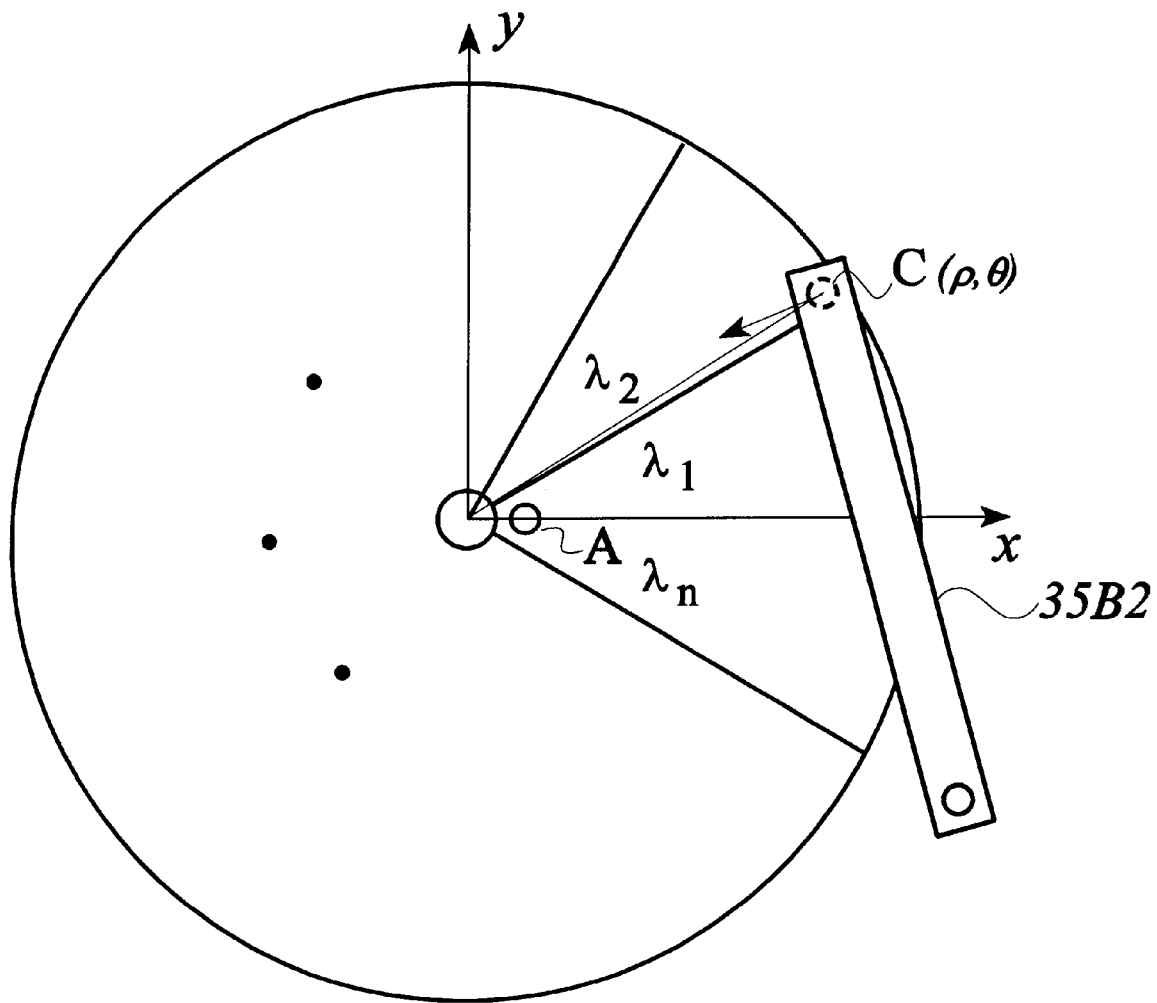
Fig. 3B2

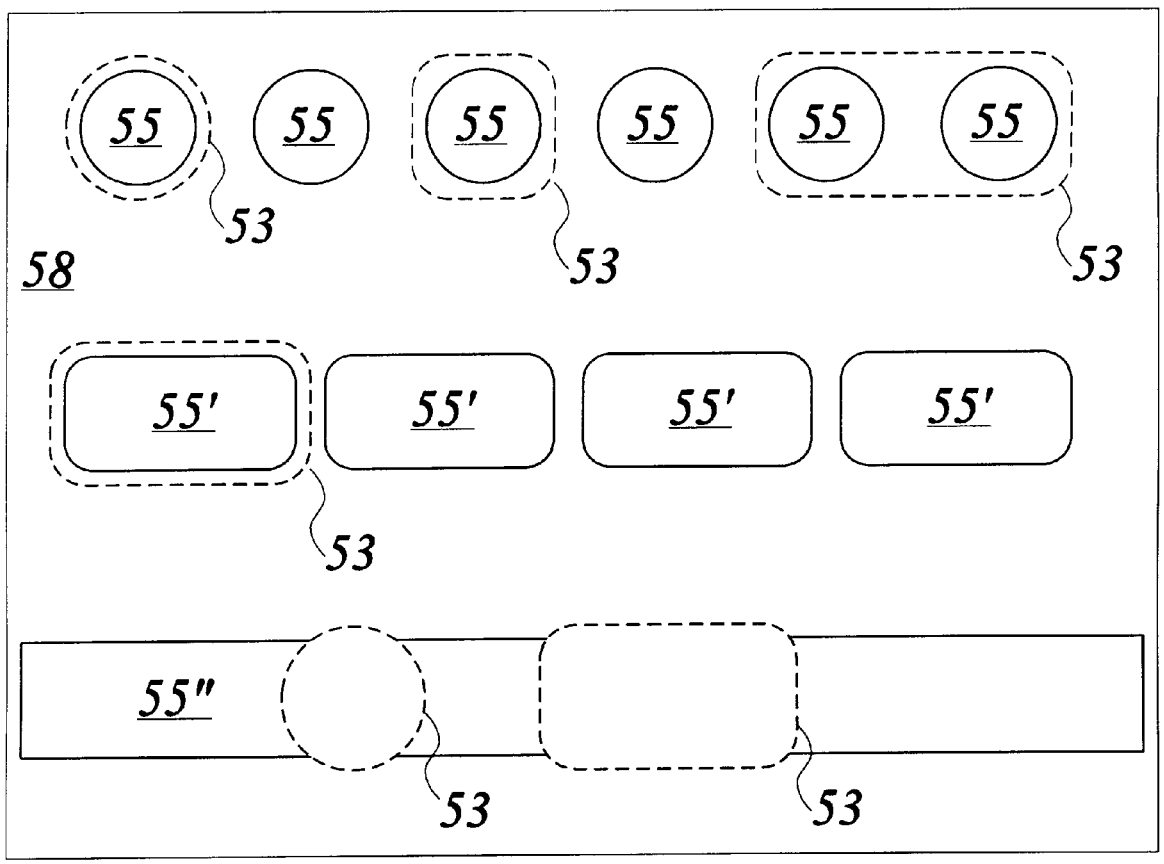
Fig. 5B1

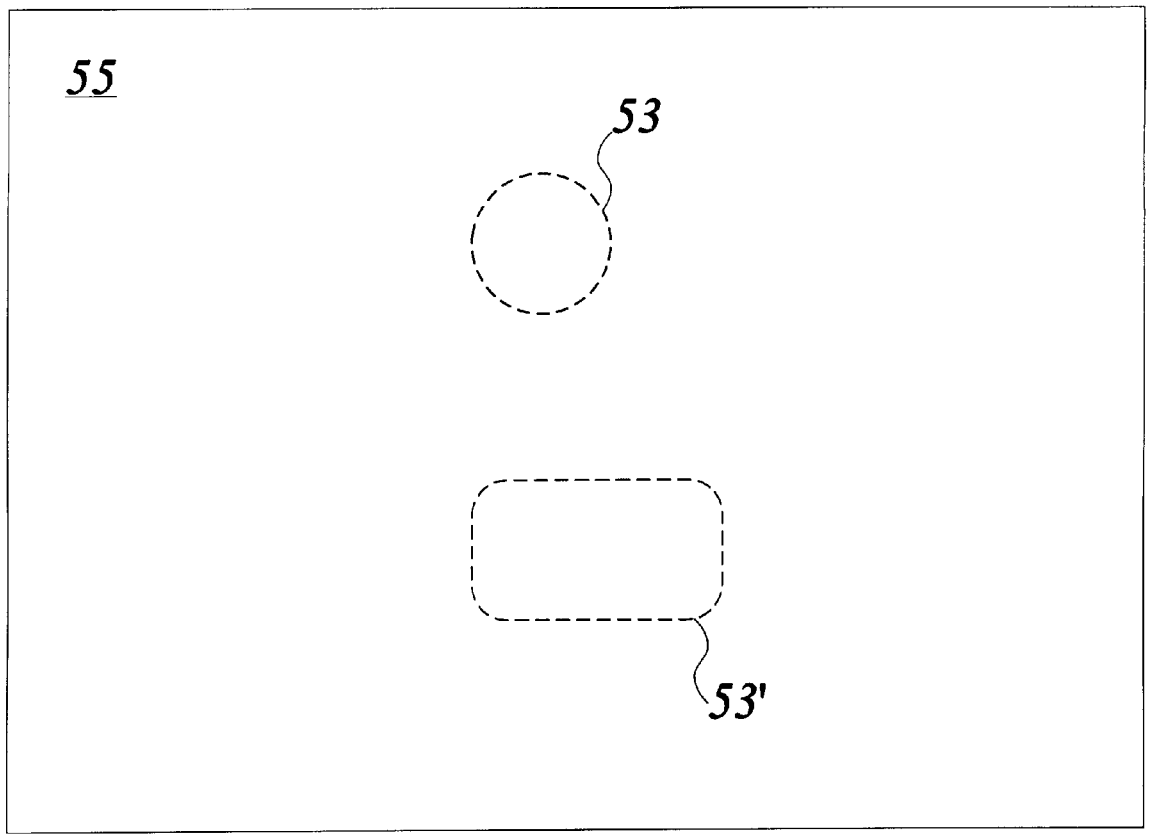
Fig. 5B2

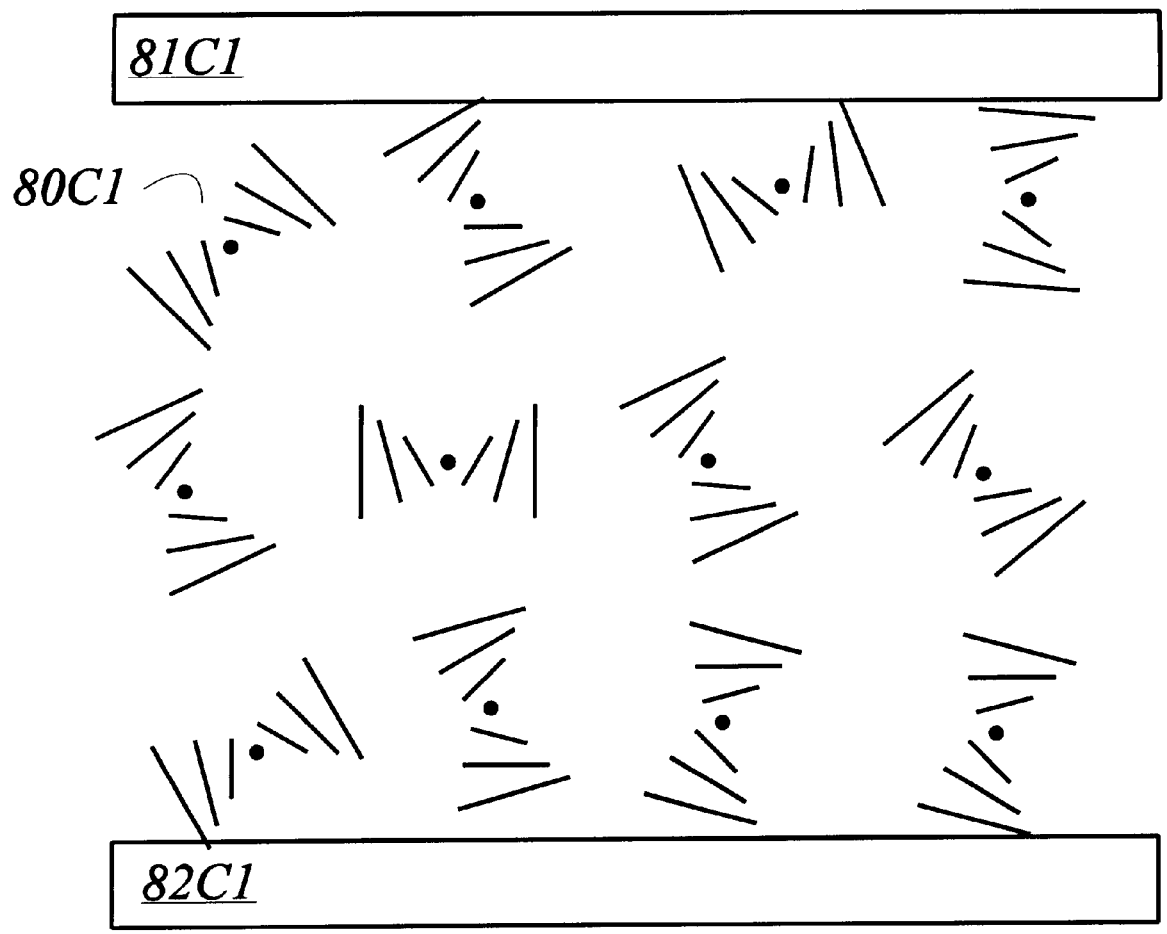
Fig. 8C1

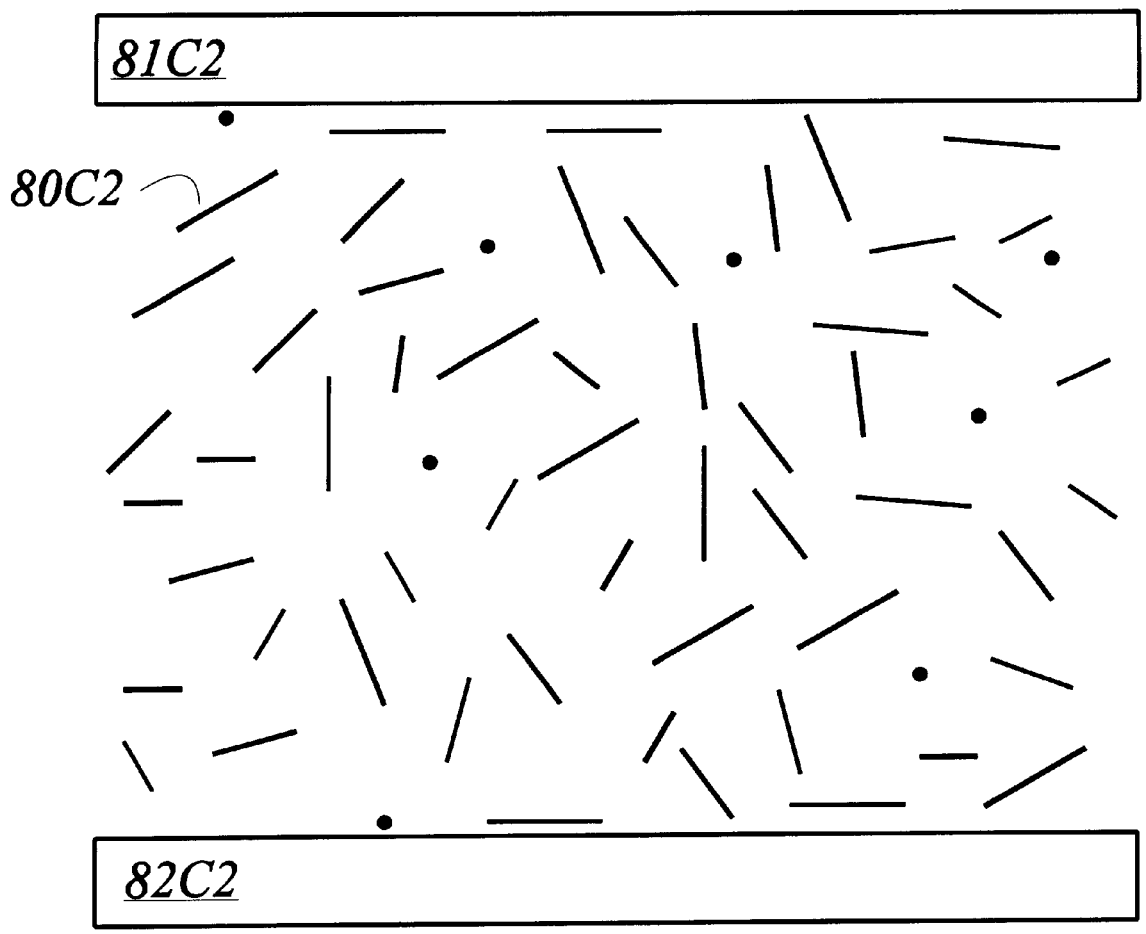
Fig. 8C2

SOLID STATE DYE LASER

BACKGROUND OF INVENTION

1. Field of Invention

The present invention relates to an organic dye laser system employing a novel solid state periodic structure as a distributed-feedback host.

2. Background Information

Throughout this application, various publications and patents are referred to by an identifying citation. The disclosures of the publications and patents referenced in this application are hereby incorporated by reference into the present disclosure.

Since their discovery in 1966, organic dye lasers have been one of the most versatile coherent light sources. These lasers provide broad tunability over a spectral range that covers the ultraviolet (UV) to near-infrared (NIR) and their pumping methods are flexible. Dye lasers are highly efficient and they can be operated in either a continuous-wave (CW) mode with kilohertz linewidth or in pulsed mode with femtoseconds in duration. The cost of the organic dyes is negligibly small, compared to that of solid-state tunable lasers such as Ti:sapphire lasers. Dye lasers have been operated using solids, liquids or gases as the gain medium. Liquid dye lasers are especially popular because cooling and replenishing are achieved by a simple circulating system. A liquid gain medium is self-repairing, in contrast to a solid-state medium where damage is permanent. Despite these attractive attributes, liquid dye lasers remain problematic as they tend to be difficult to handle and many dyes and solvents raise health and environmental concerns.

Laser dye in a solid matrix has been actively developed as an alternative. Recent approaches to realize solid-state dye lasers include incorporating the laser dyes in polymers, such as polymethyl methacrylate (PMMA), sol-gel and organically modified silicates (ORMOSILs) as the host for the gain medium. Being in a solid-matrix, many of the problems associated with a liquid system are eliminated. However, solid-state dye lasers have been plagued by the photodegradation of laser dyes, as manifested in short operating lifetime. The photodegradation problem may be circumvented by a gain medium moving relative to the pump beam. Dispersive elements such as grating, prism or a combination of them within the optical cavity are typically used for wavelength tuning. While such intracavity configuration offers tuning flexibility, it generally requires a stable opto-mechanical alignment for optimal performance.

Mirrorless dye lasers with optical feedback distributed throughout the gain medium were first reported in 1971. (C. V. Shank, J. E. Bjorkholm and H. Kogelnik, 'Tunable distributed-feedback dye laser,' *Applied Physics Letters*, 18, 152 (1971)). The distributed feedback (DFB) is obtained by a gain medium with a spatial modulation either in refractive index or gain in the direction of light propagation through the gain medium, i.e., in or parallel to the film plane. Periodic modulation in gain and index can be obtained, for example, by two interfering coherent pump laser beams on a dye-doped film. The laser emission is in, or parallel to, the film plane, normal to the periodic structure and the output wavelength is set by the periodicity. By either varying the angle between interfering pump beams or the refractive index of the dye solvent, the dye laser can be tuned. DFB dye lasers, in which the gain medium, laser cavity and wavelength tuning elements are combined into a thin film, offer potential advantages. However, photodegradation remains problematic as such DFB dye lasers tend to be difficult to implement with a moving gain medium, thereby making them impractical.

Goldberg et al, in U.S. Pat. No. 3,771,065, entitled 'Tunable internal-feedback liquid crystal-dye laser,'filed Nov. 6, 1973) and later Il'chishin et al (I. P. Il'chishin et al, 'Detecting of the structure distortion of cholesteric liquid crystal using the generation characteristics of the distributed feedback laser based on it,' *Molecular Crystals and Liquid Crystals*, 265, 687 (1995), and I. P. Il'chishin et al, 'Generation of a tunable radiation by impurity cholesteric liquid crystals,' *JETP Letters*, 32, 24 (1980)), have disclosed dye lasers with cholesteric liquid crystal (CLC) as a host that provides distributed feedback. Typically, the dye-doped CLC is confined between two flat glass substrates. The CLC is aligned in the so-called planar texture, resulting in a phase grating through the CLC layer. The laser emission is normal to the film plane and the output wavelength is set by the helical periodicity. By varying the temperature of the CLC host, the helical pitch of the CLC host can be changed, thereby the output wavelength of the dye laser can be tuned. However, the operation of these dye lasers which utilize CLC hosts in fluid form is subject to environmental perturbation, such as temperature. In addition, the photodegradation is still problematic as these DFB dye lasers are difficult to implement with a moving gain medium, thereby making them impractical for many applications.

SUMMARY OF THE INVENTION

According to one aspect of the present invention, a solid state dye laser adapted for use in a solid state dye laser assembly having a pump adapted to emit electromagnetic radiation at a first frequency and intensity, includes:

a gain medium being in a substantially solid state, and doped with a fluorescent dye adapted to emit light within a predetermined spectral tuning range;

the gain medium being adapted to receive the electromagnetic radiation emitted from the pump, wherein the gain medium is stimulated to emit laser light therefrom.

A second aspect of the present invention, a solid state dye laser assembly includes:

a solid state dye laser including a gain medium being in a substantially solid state and doped with a fluorescent dye adapted to emit light within a predetermined spectral tuning range;

a pump adapted to emit electromagnetic radiation at a first frequency and intensity into the gain medium to stimulate laser emission from the gain medium;

the gain medium being adapted for movement relative to the pump.

In a third aspect of the present invention, a solid state dye laser adapted for use in a solid state dye laser assembly having a pump adapted to emit electromagnetic radiation at a first frequency and intensity, includes:

an elongated web of polymeric material having a gain medium disposed therein, the gain medium being in a substantially solid state and doped with a fluorescent dye adapted to emit light within a predetermined spectral tuning range;

the gain medium including polymeric cholesteric liquid crystal disposed in a planar texture and frozen into a characteristic wavelength;

the gain medium being adapted for movement relative to the pump.

The above and other features and advantages of this invention will be more readily apparent from a reading of the following detailed description of various aspects of the invention taken in conjunction with the accompanying drawings.

BRIEF DESCRIPTION OF THE DRAWINGS

FIG. 3B1 illustrates a preferred organization scheme for the dye laser disc shown in FIG. 3A.

FIG. 3B2 illustrates another preferred organization scheme for the dye laser disc shown in FIG. 3A.

FIG. 5B1 illustrates the relationship between the pumping and distributed-feedback dye laser which is surrounded by a region in isotropic state or focal-conic texture.

FIG. 5B2 illustrates the relationship between the pumping and the distributed-feedback dye laser which is surrounded by a region in a planar texture with a characteristic wavelength same or different from that of the dye laser region.

FIG. 8C1 illustrates schematically the molecular ordering of a CLC in the focal-conic texture.

FIG. 8C2 illustrates schematically the molecular ordering of a CLC in the isotropic state.

DETAILED DESCRIPTION OF THE ILLUSTRATIVE EMBODIMENTS OF THE PRESENT INVENTION

Figure 1:
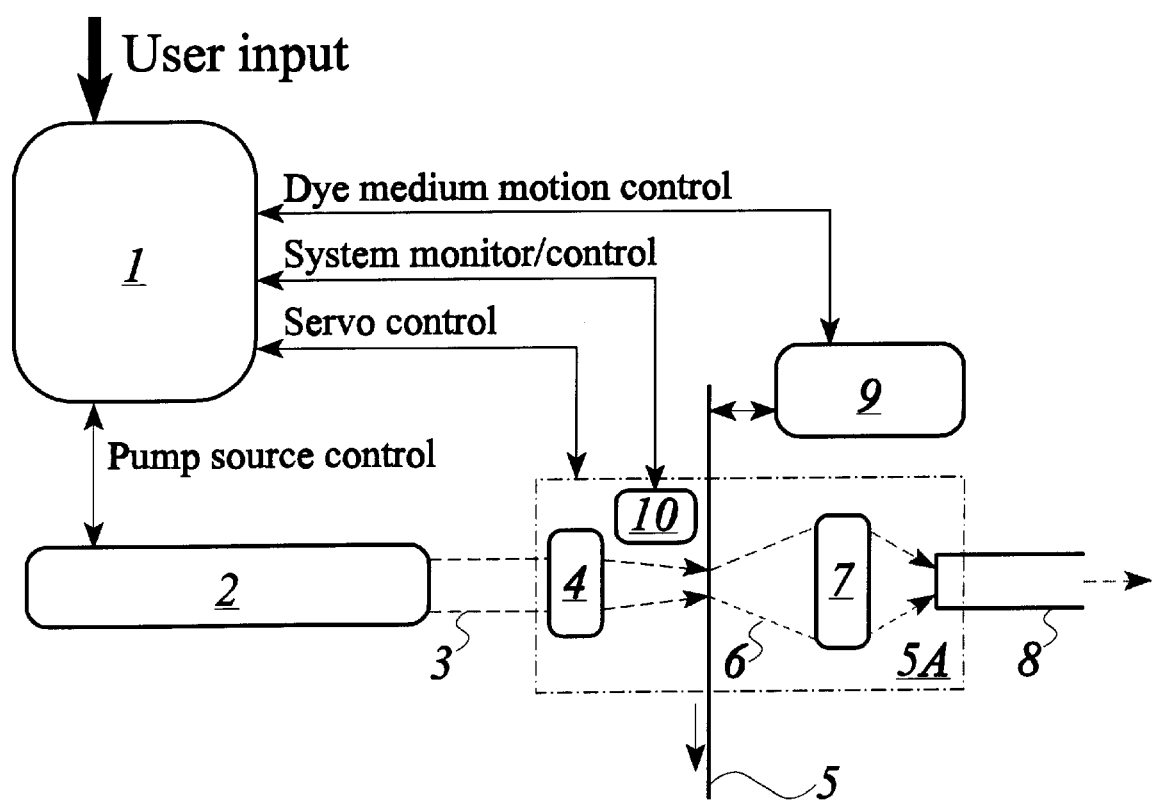
FIG. 1 shows schematically the solid-state organic dye laser system of the present invention.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

The present invention includes solid-state dye lasers which use a cholesteric liquid crystal (CLC) as a distributed-feedback (DFB) host. FIG. 1 illustrates a preferred embodiment of the dye laser system of the present invention. The system comprises of the following: a system control unit 1, a pump source 2 with its associated optics 4, the dye laser 5 with its associated motion actuator 9 and system monitor 10, and output coupling 8 with its associated optics 7. The system control unit 1 provides the interface to the user and controls the functioning of the dye laser system. It can be, for example, a microcomputer, either dedicated or a part of a system. The pump source 2 is used to optically excite or pump the said dye laser. Any source capable of emitting electromagnetic radiation (light) with a frequency higher than the dye laser emission frequency will be a suitable pump source. Typically, the pump source is a pulsed laser with an output wavelength shorter than the output wavelength of the dye laser, for example, a frequency-multiplied diode-laser-pumped Nd:YAG laser. For example, in addition to a fundamental (1060 nm) and second (530 nm) frequencies, the third (355 nm) and fourth (266 nm) harmonics of the pump output can also be used. The choice depends on the particular dye. Other suitable pump lasers include nitrogen, excimer lasers, as well as semiconductor diode lasers. Light from a fast-risetime flashlamp is also suitable as a pump source. The duration of the pump light pulses can be of millisecond to picosecond long. Notably, the pulsed pumping is chosen as undesireable effects of thermal defocusing and triplet-triplet absorption are reduced to achieve stimulated emission. Continuous-wave (CW) pumping is possible for the dye laser of the present invention, if the dye laser film is moved sufficiently fast with respect to the pump beam.

The dye laser 5 of the present invention is in the form of thin film which is 5 to 100 microns thick. Even though the gain path is relatively short, the optical gain for the dye medium is sufficiently high to result in laser action. Dye lasers with a gain length of 50 to 125 microns and pumped by picosecond optical pulses have been demonstrated as discussed in an article by B. Fan and T. K. Gustafson, 'Narrow-band picosecond pulses from an ultrashort-cavity dye laser,' *Applied Physics Letters*, 28, 202(1976), which is hereby incorporated by reference in its entirety, herein. The dye laser film 5 can have a physical shape of the tape form that has a lengthwise dimension much larger than its widthwise dimension, similar to the shape of familiar audio or video tape. It can also have a shape of the disc form that has a circular shape, similar to that of diskettes for data storage. Still further, the dye laser film can be fabricated in the shape of a card having a generally rectangular shape with close lengthwise and widthwise dimensions, similar to that of a credit card. These forms will be described below shortly. Optics 4 is used to focus the pump light beam 3 into a small spot on the dye laser film. Optics 4 may be, for example, a microscope lens. Typical beam spot on the dye laser film is of a few microns in diameter. Notably, the purpose of focusing the pump light beam is to increase the pump intensity to above lasing threshold. The dye laser system of the present invention may include a pump light beam either tightly focused to a small spot, lightly focused to a larger spot on the dye laser film or unfocused, i.e., without the use of optics 4, as long as the intensity of the pump beam is above the lasing threshold. In other words, optics are not necessary for the present invention to be operable. The optics are used to focus the pump light to a small spot, so the intensity of the pump light or flux, (pump photon per unit area) is increased to reach above the lasing threshold. The light output of the dye laser 6 is preferably coupled into an optical fiber or lightpipe 8 by means of a coupling optics, 7, for example, a lens. Notably the use of optical fiber or lightpipe in the system does not affect the dye laser operation itself. The beam delivery subsystem is for user convenience. A set of relay mirrors to direct the dye laser output to the user can also be effective in this regard.

Figure 5A:
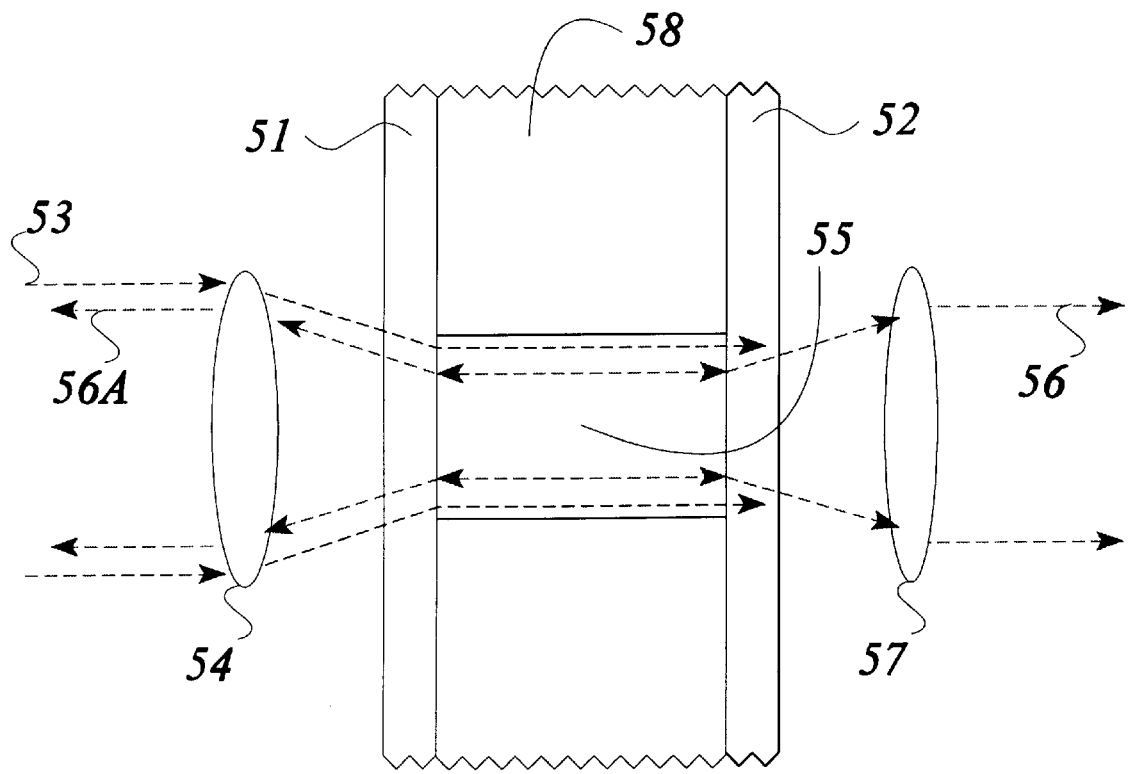
FIG. 5A illustrates a preferred embodiment of the distributed-feedback dye laser of the present invention.

Throughout this disclosure, the terms "gain medium" shall refer to a dye-doped medium adapted for stimulation by light emitted from a light pump, to emit laser light during operation of the present invention. The terms "optical pumping zone", "optical pumping area" or "laser cavity", shall refer to a portion of the gain medium through which light emitted from a light pump propagates during operation of the dye laser of the present invention. Similarly, the term "planar texture" shall refer to a state in which substantially all the Cholesteric Liquid Crystal (CLC) molecules in a particular optical pumping area or zone are disposed in parallel periodic helical structures. The term "focal-conic texture" shall refer to a state in which substantially all the CLC molecules in a particular optical pumping area or zone are disposed in periodic helical structures which are not parallel to one another. The term "isotropic state" shall refer to a state in which substantially all the CLC molecules in a particular optical pumping area or zone are oriented randomly relative to one another. The term "light" shall refer to any electro-magnetic radiation within a range of wavelengths from near infra-red to far ultra-violet. The term "isotropic" shall mean that the refractive index of a material is independent of the polarization direction of light. Similarly, the term "anisotropic" shall mean that the refractive index of a material is polarization direction-dependent. The terms "homogeneous" and "inhomogeneous" mean that the refractive index of a particular layer is, respectively, position-independent and position-dependent. The terms "film plane" or "planar" shall be defined as the plane of the film, i.e., generally normal to the propagation direction of the laser light through the gain medium such as shown in FIG. 5A.

The motion means 9 is to move the dye laser film relative to the focused pump beam spot, in order to overcome the photodegradation and thermal defocusing effects of the laser dye film. In this regard, dye lasers tend to absorb pump photons of relatively higher energy and emit photons of relatively lower energy. The difference in the photon energy is dissipated as heat in the gain medium. Nonuniform temperature in the film tends to distort the uniformity of the refractive index of the film, which in turn, may distort the dye laser output beam. This is more a problem when the laser is operated at high repetition rates.

The motion means is under control of the system control unit, based on signals from the system monitor. It is clear from the above teaching that the motion of dye laser film is relative to the pump beam. It is advantageous to have a combination of motions, the dye laser film 5 moving in one direction with respect to a reference frame, and the pump head 5A (pump beam together with beam delivery and monitoring subsystems enclosed in dotted line) moving in the other direction. It should be apparent to the skilled artisan that the two directions do not need to be orthogonal to one another. The motion of the dye laser film can be either in a continuous or discrete (stop-and-then-move) fashion with respect to time. Continuous motion is essential for CW, long pulse or high-repetition-rate operation. Discrete motion, that is, the dye laser film is stationary for certain number of pulsed operation and is moved to a new location on the film to overcome photodegradation, is applicable for short pulse operation at low repetition rates.

Figure 5C:
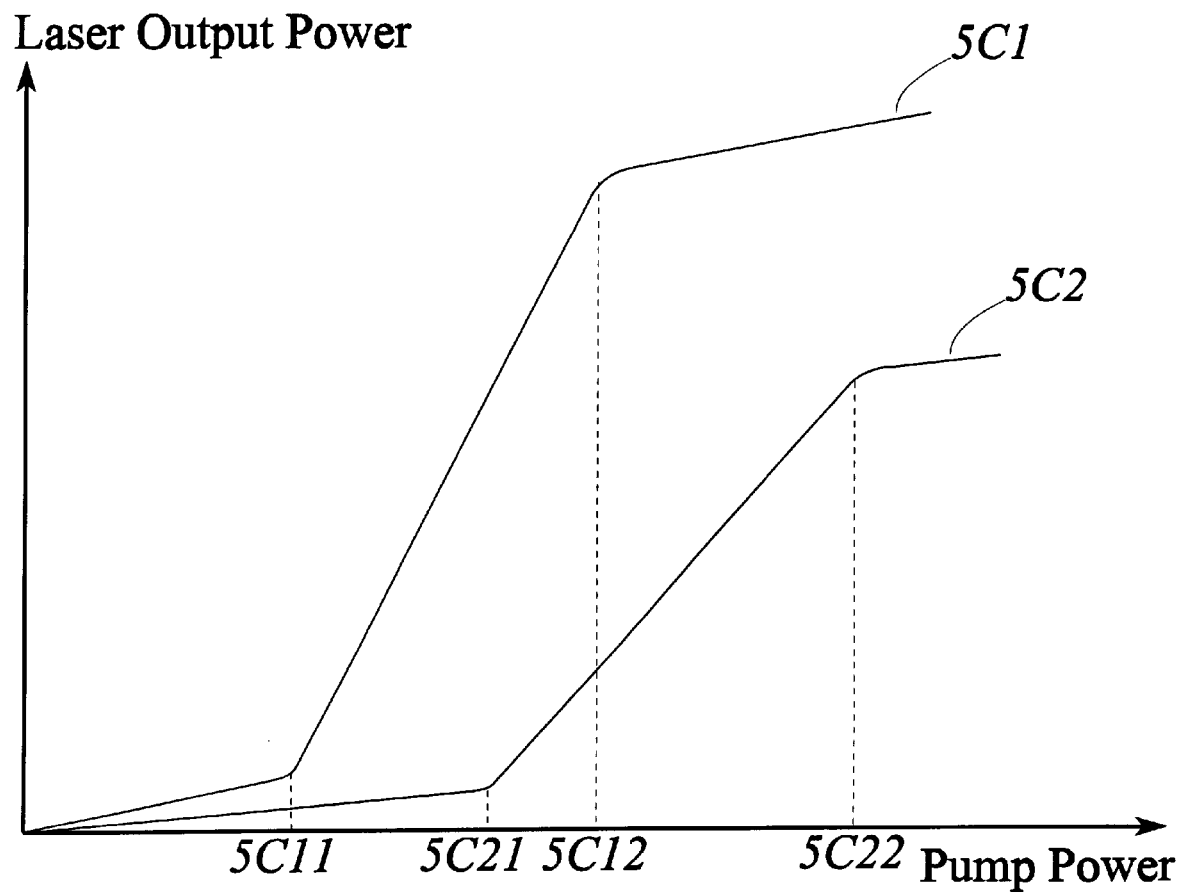
FIG. 5C illustrates the relationship between the pump power vs dye laser output power.

The laser system may be monitored in several ways. For example, the dye laser film may be pre-tested or characterized for its fluorescence yield, lasing threshold and lasing efficiency. The dye laser film may be monitored in-situ, i.e. during emission of dye laser light, for these performance parameters. Alternatively, the dye laser film may be monitored during optical pumping at levels below the lasing threshold, as will be discussed hereinafter. The fluorescence monitor 10 is adapted to provide this fluorescence monitoring of the dye which is being optically pumped. A reduction in the fluorescence yield indicates deterioration in operating efficiency (laser output power vs pump power) of the dye laser. By noting the yield, the operating lifetime of the region can be preset. The fluorescence monitor consists of a lens system that collects light emitted from the dye laser film, an optical filter system that reduces the ambient light and pump light and a photodetector with associated electronics that converts an optical signal into an electronic signal which is processed further by the system control unit 1. The fluorescence monitor will be discussed in greater detail hereinafter with respect to various embodiments of the present invention. A light source is also included, if the pump light is not utilized. The photodegradation can also be monitored by dye laser output power. The dye laser power monitor consists of an optical filter system that reduces the ambient light and pump light and a photodetector with associated electronics that converts an optical signal into an electronic signal which is processed further by the system control unit. A reduction in the dye laser output power indicates deterioration in laser efficiency of the dye laser. The photodegradation can also be monitored by lasing threshold of the dye laser. The lasing threshold is the minimum pump intensity required to obtain laser emission. An increase in the lasing threshold indicates deterioration in laser efficiency of the dye laser. FIG. 5C schematically plots the relationship between the pump power vs dye laser output power. Two examples 5C1 and 5C2 are plotted, to indicate the operating conditions of a dye film laser, 'fresh' and 'used for long time', respectively. The threshold pump powers are indicated by 5C11 for curve 5C1 and 5C21 for curve 5C2. When the pump power is above this threshold, stimulated emission occurs. Over a range of the pump power (indicated by 5C11 and 5C12 for 5C1), the laser output power is substantially linearly dependent on the pump power. The slope is defined as the laser efficiency. The dye laser is preferably operated in this region. For the pump power beyond 5C12 for 5C1, the dye laser is in the saturated region, and is avoided as the laser efficiency is reduced. As shown in curve 5C2, the operational lifetime of the laser is near its end because of higher threshold and lower laser efficiency. Depending on applications, an increase of 20% in laser threshold or a decrease of 10% in laser efficiency may be considered as an indicator that the laser is near the end of its operational lifetime.

As each laser dye has limited spectral tuning range, the dye laser system of the present invention may be practiced with a plurality of dye laser films 5 (FIG. 1), each having a different laser dye. In this manner, a user may choose a film 5 having a particular dye that emits in a desired spectral range. Examples of dyes and their spectral ranges include DMT dye (311 to 348 nm), BBQ dye (360 to 410 nm), stilbene 420 dye (410 to 480 nm), rhodamine dyes (530 to 700 nm), oxazine dyes (670–800 nm) and other laser dyes readily available commercially, for example, from Exciton, Inc. of Dayton, Ohio 45431. These examples are simply representative, and many additional laser dyes suitable for use with the present invention are available from Exciton and other sources. Moreover, gain media having distinct dyes may be arranged in a side-by-side manner to produce a laser output having a broader spectral range, as will be discussed in greater detail hereinafter with respect to FIG. 5B1. It is clear to those skilled in the art that the dye laser output can be frequency-doubled, such as by second harmonic generation as described by, for example, W. V. Smith in *Laser Applications,* (Artech House, Inc., Dedham, Mass., 1970). Briefly described, this may be accomplished by passing the laser output through a non-linear material, so that the emerging light has two frequency components: the original frequency and its second harmonic. The dye laser output may also be mixed with the pump laser light to provide a coherent light beam beyond the spectral range of the dye laser associated with the specific dye.

Figure 2A:
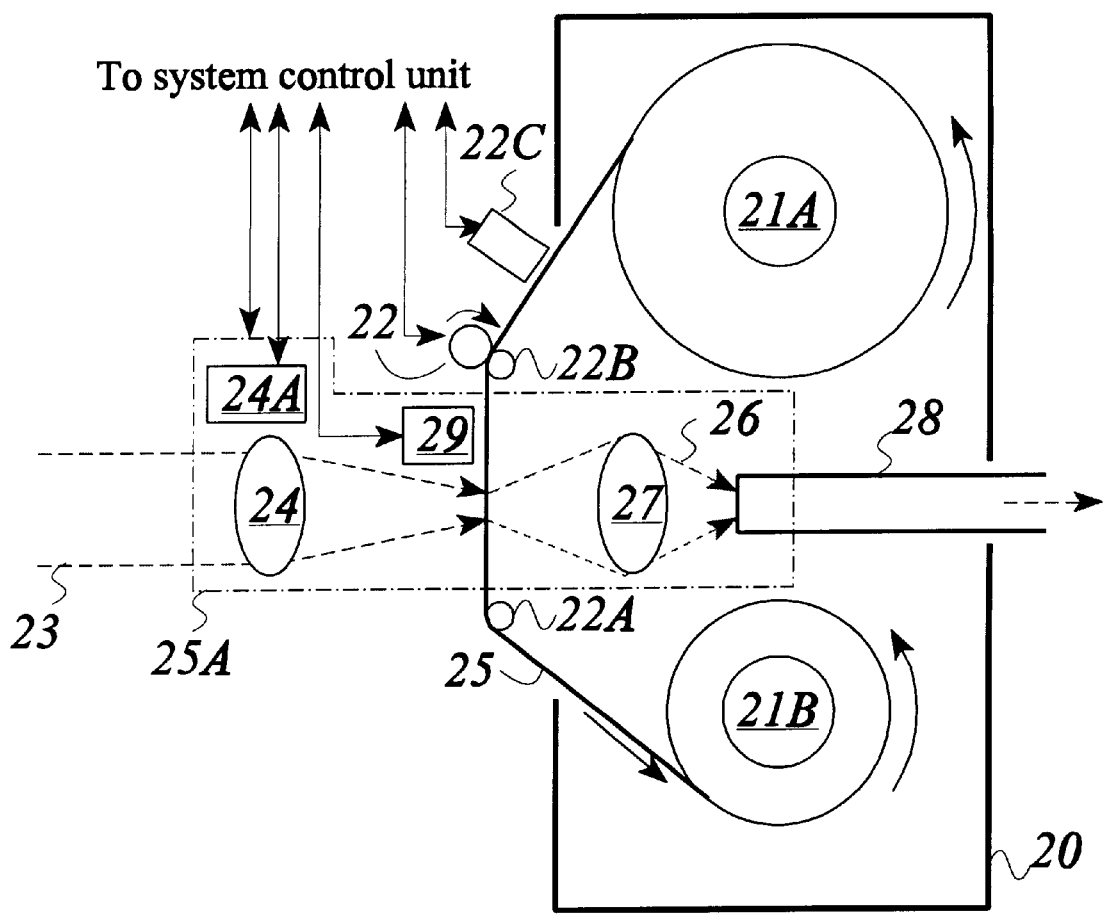
FIG. 2A is a schematic plan view of a preferred embodiment of the laser system present invention using a tape embedded with a laser dye.

FIG. 2A shows a preferred embodiment of the present invention with the dye laser film in tape form. The dye laser tape 25 is wound around two reels 21A and 21B. As shown, the reels are housed in a cassette 20, similar to that for audio or video tapes. Notably the use of cassette 20 in the system does not affect the dye laser operation itself. The tape cassettes are for the user's convenience. Open reels may also be utilized. The light beam 23 from the pump source is preferably focused into a small spot on the dye tape, by a focusing means 24. The dye laser output beam 26 is coupled into an optical fiber or lightpipe 28 by means of a lens system 27. The motion of the tape is actuated by rotating roller 22. A pair of idling rollers 22A and 22B keep the flexible tape flat and maintain the distance between the tape 25 and the focusing means 24. Optionally, an autofocusing means 24A is provided to finely adjust this distance to maintain focusing. Automatic focusing techniques used for optical data storage can be readily adopted. For example, see M. Mansuripur, *The Physical Principles of Magneto-optical Recording,* Cambridge University Press, 1995. A conventional positional decoder (not shown) determines the lengthwise location (x-coordinate) of the tape during operation.

Figure 2B:
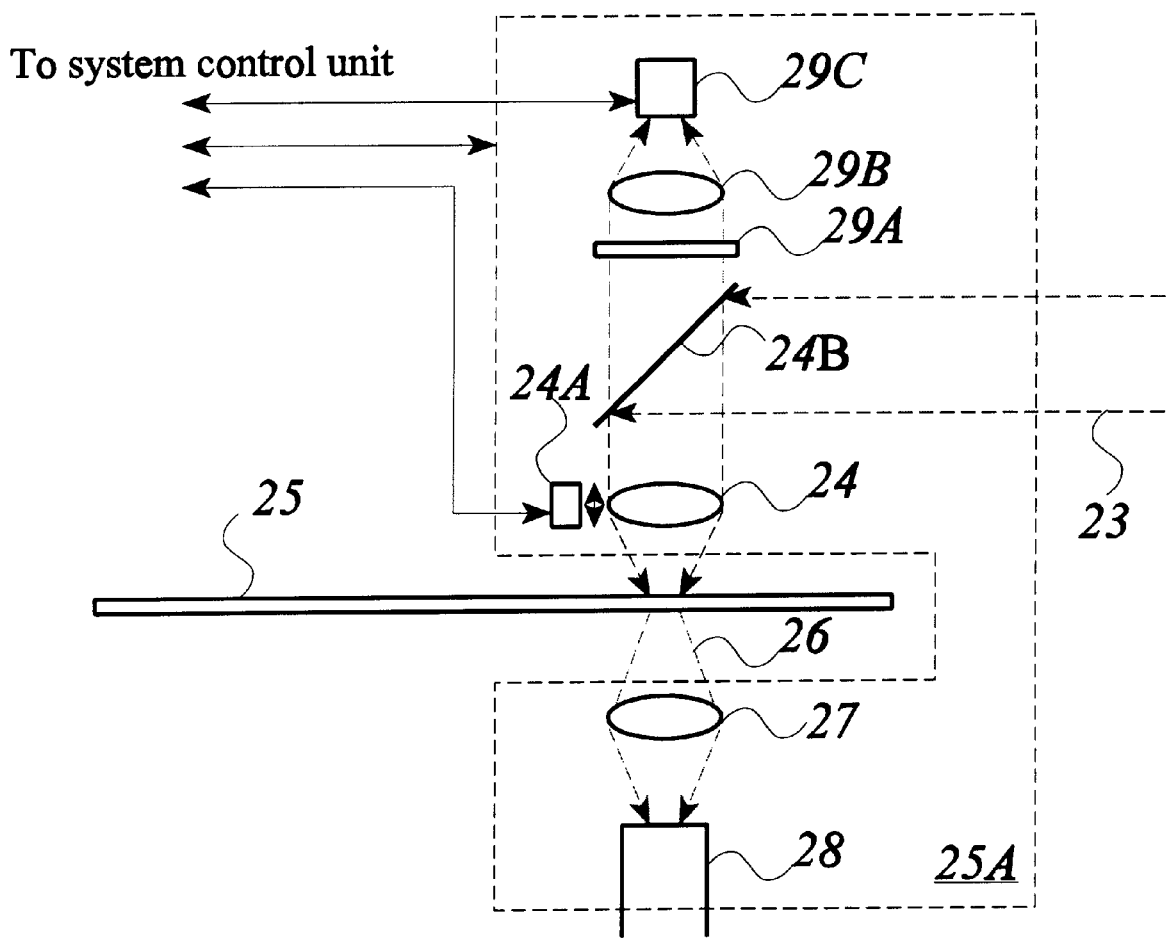
FIG. 2B is a schematic plan view of an arrangement of optics for the laser system shown in FIG. 2A.

Turning now to FIG. 2B, an arrangement of optics for the laser system of FIG. 2A is shown. Fluorescence monitor 29 (FIG. 2A) includes an optical filter 29A, a focusing lens 29B and a photodetector 29C. The light used to excite the dye is the pump light itself. A dichroic beamsplitter 24B separates spatially the fluorescence light from the pump beam. The dichroic beamsplitter reflects substantially at the pump wavelength, and transmits substantially at the fluorescence wavelength. Thus, monitor 29 is adapted to provide in-situ fluorescence monitoring. A means (not shown) is provided to move the pump head 25A (enclosed within the dotted line) to access different locations across the dye laser tape. Such movement means may include any suitable positional decoders, such as those commonly utilized in the computer industry to enable read/write heads to locate desired tracks and sectors of a hard disk drive.

Figure 2C:
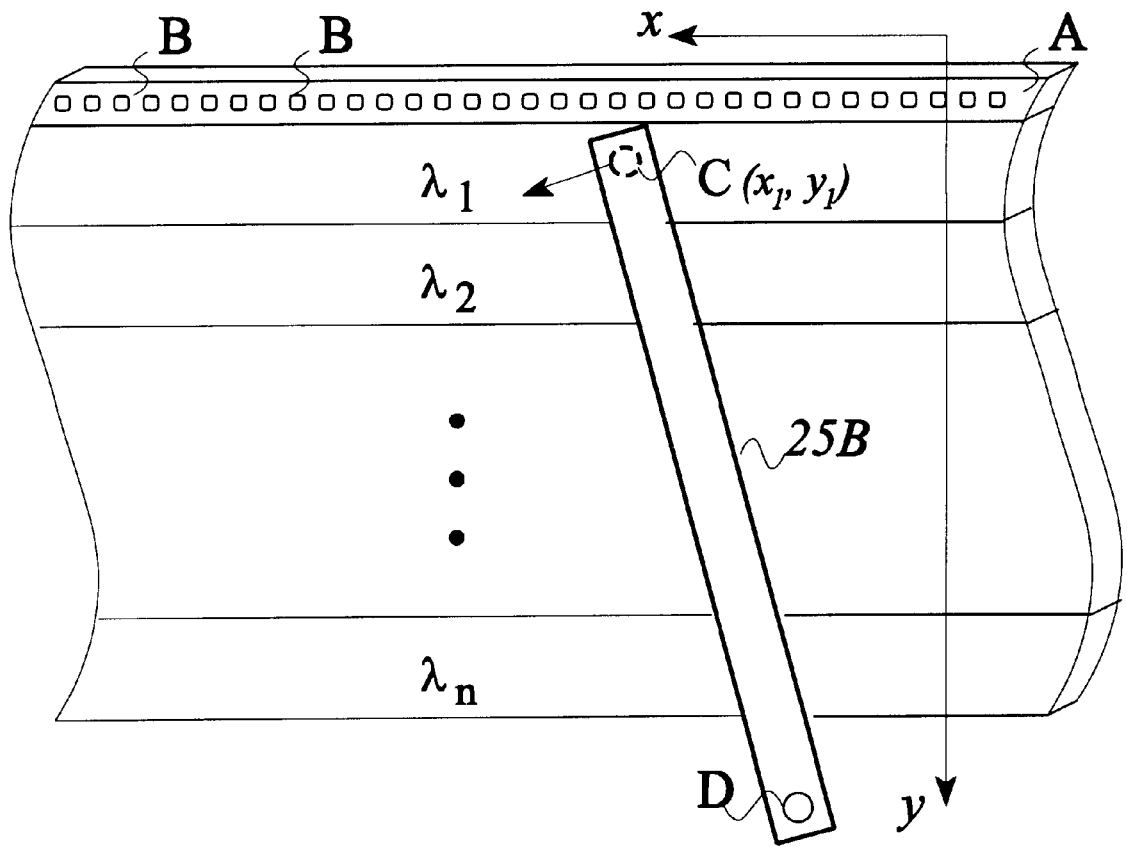
FIG. 2C shows an organization scheme for the dye laser tape shown in FIG. 2A.

FIG. 2C shows an organizational scheme for the dye laser tape. The tape is divided into a plurality of strips. Strip A is for positional control of the tape. A location means is provided to enable a suitable positional decoder to determine the lengthwise position (i.e., along the x-axis as shown) of the tape relative to the pump head 5A. For example, the tape can be optically encoded by perforating holes along the tape, (as shown at B). By counting the light pulses passing through these holes, the lengthwise position (x-coordinate) of the dye laser tape can be determined. As another example, the tape can be magnetically encoded by writing patterns on a magnetic strip in the strip A. By reading the magnetic signal, the x-coordinate on the dye laser tape can be determined. The y-coordinate can be determined from position of the pump head. For example, the pump head 25A can be mounted on an arm 25B, which can be rotated around a pivot D, as shown. Alternatively, the pump head can be mounted on an arm, which can be linearly translated along in the direction of y-axis. The other strips are dye lasers with the CLC host tuned to wavelengths, $\lambda_1, \lambda_2, \ldots, \lambda_n$. The dotted circular area C on the strip $\lambda_1$ at location $(x_1, y_1)$ is being optically excited, resulting in a laser emission from the tape of a wavelength approximately $\lambda_1$. For the output wavelength $\lambda_k$, the pumped spot C is moved to the CLC host tuned to wavelength $\lambda_k$. It is clear the organizational scheme for the dye laser tape is not restricted to the configuration as shown in FIG. 2C. A tape divided into a plurality of zones or regions, each tuned to a different lasing wavelength and a provision for positional decoding are suitable for the dye laser system of the present invention.

Figure 3A:
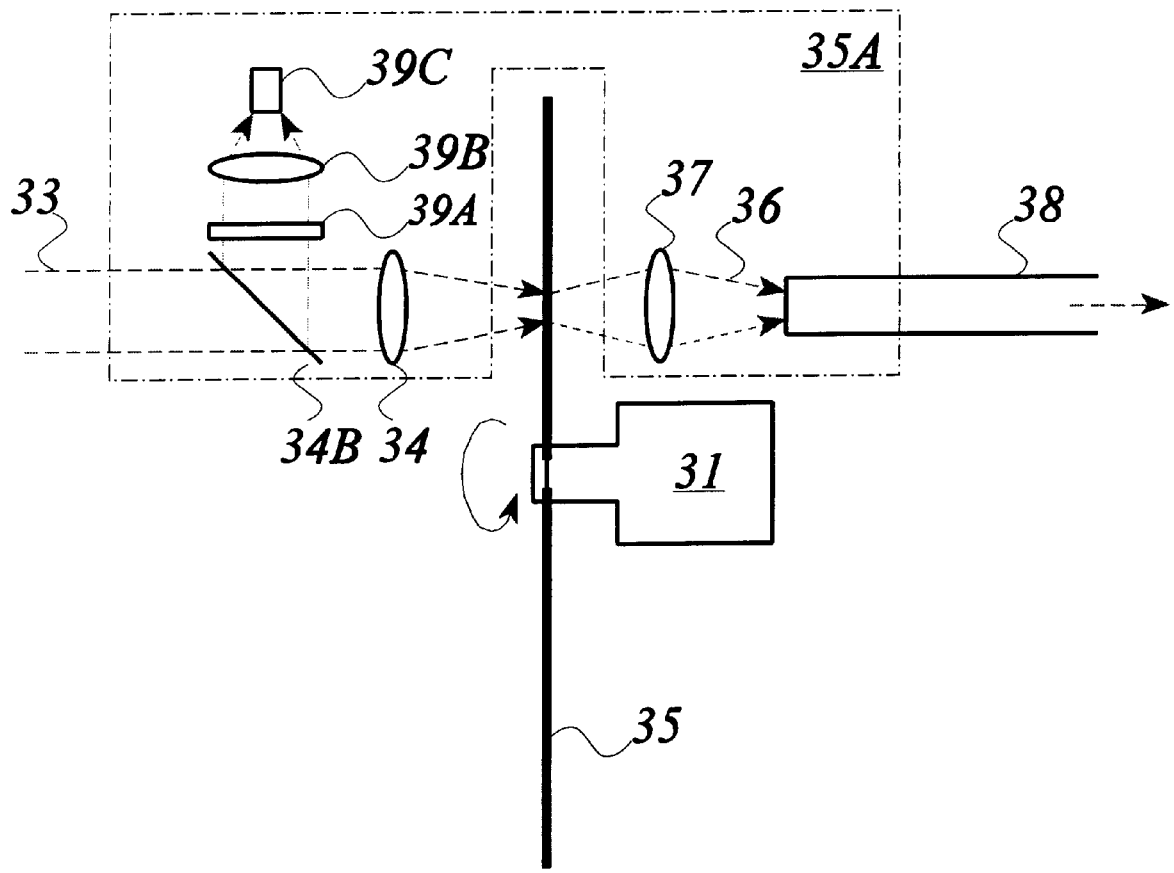
FIG. 3A shows another preferred embodiment of the dye laser system using a disc embedded with a laser dye.

FIG. 3A shows another preferred embodiment of the present invention with the dye laser film in a disc form. The dye laser disc 35, is mounted on a motor 31 which serves to rotate the disc about its central axis. The pump beam 33 from the pump source is focused into a small spot on the dye tape, by means of a lens system 34. Fluorescence is monitored in a similar manner to that described in connection with FIG. 2B. Briefly, a fluorescence monitor includes an optical filter 39A, a focusing lens 39B and a photodetector 39C. The light used to excite the dye is the pump light itself. A dichroic beamsplitter 34B separates spatially the fluorescence light from the pump beam. In this embodiment, dichroic beamsplitter 34B transmits substantially at the pump wavelength, and reflects substantially at the fluorescence wavelength. The dye laser wavelength is within the fluorescence wavelength band. In this embodiment, the pump level is preferably kept well below the lasing threshold during fluorescence monitoring. During laser operation, the fluorescence monitor electronics are turned off, so monitoring for fluorescence is not in-situ. However, the same detection system can become a laser output monitor. In practice, an initial checking for fluorescence yield, threshold, laser efficiency, is done. Thereafter, laser efficiency may be monitored in situ. The dye laser output beam 36 is coupled into an optical fiber 38 by means of a lens system 37. FIG. 3B1 shows an organizational scheme for the dye laser disc. The disc is divided into a plurality of circular strips which are dye lasers with the CLC host tuned to different wavelengths, $\lambda_1, \lambda_2, \ldots, \lambda_n$. FIG. 3B2 shows another organizational scheme for the dye laser disc. The disc is divided into a plurality of wedges which are dye lasers with the CLC host tuned to different wavelengths, $\lambda_1, \lambda_2, \ldots, \lambda_n$. A means is provided such that the angular location of the disc where the dye laser operation takes place is known. A variety of positional decoders may be used for such purpose. The angular coordinate ($\theta$) can be determined by a rotary encoder with the motor 31. The radial position ($\rho$) can be determined from position of the pump head 35A which is mounted on an arm 35B1 (for FIG. 3B1). The origin (0,0) can be conveniently encoded by embedding a magnetic tag or perforating a single hole on the disc, (as shown at A). It is clear the organizational schemes for the laser disc is not restricted to the configurations as shown in FIGS. 3B1 and 3B2. A disc divided into a plurality of zones, each tuned to a different lasing wavelength and a provision for positional decoding are suitable for the dye laser system of the present invention.

Figure 4A:
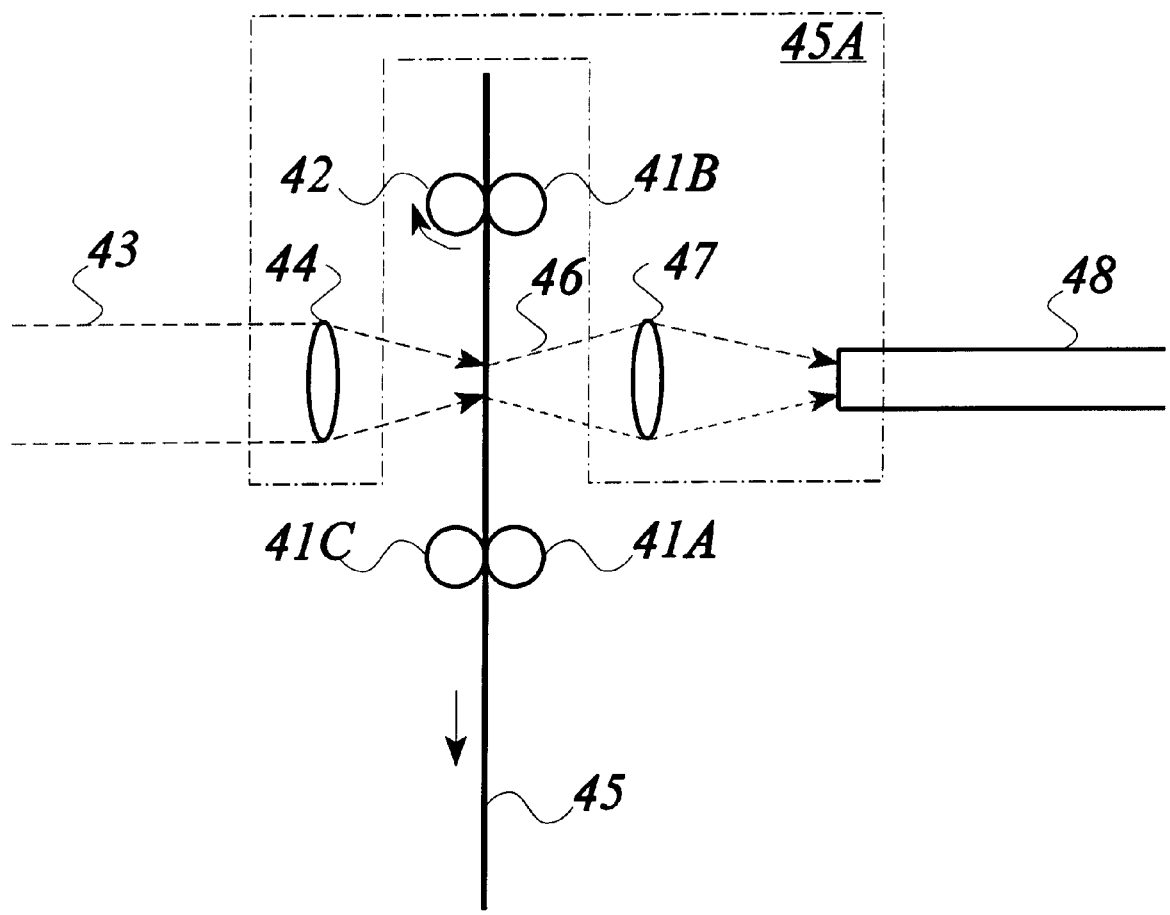
FIG. 4A shows another preferred embodiment of the dye laser system using a card embedded with a laser dye.
Figure 4B:
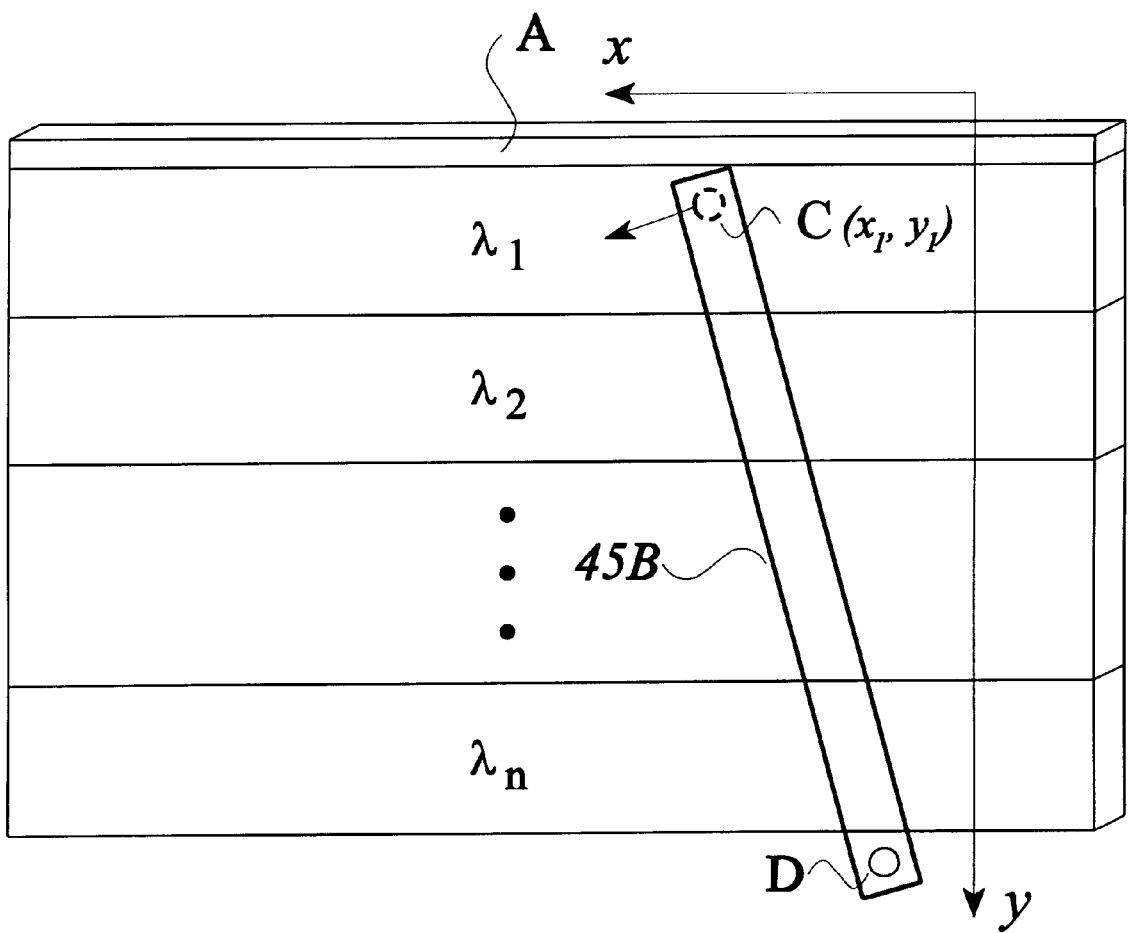
FIG. 4B shows a preferred organization scheme for the dye laser card system shown in FIG. 4B.

FIG. 4A shows another preferred embodiment of the present invention with dye laser film in the card form. The dye laser card 45, is fixed in position with rollers 41A, 41B and 41C. The motion of the card is actuated by a rotating roller 42. The pump beam 43 from the pump source is focused into a small spot on the dye tape, by means of a lens system 44. The dye laser output beam 46 is coupled into an optical fiber 48 by means of a lens system 47. FIG. 4B shows an organizational scheme for the dye laser card. The card is divided into a plurality of rectangular strips. Strip A is for positional control of the card. A positional encoding is implemented on this strip. A means is provided such that the lengthwise location (x-coordinate) of the card where the dye laser operation takes place is known. A variety of positional decoder can be used for such purpose. For example, the card can be optically encoded by providing a series of machine readable demarcations such as perforations as shown, along the card. As another example, the series of demarcations may include magnetically encoded patterns on a magnetic strip in the strip A. The y-coordinate can be determined from position of the pump head. For example, the pump head 45A can be mounted on an arm 45B, which can be rotated around a pivot D, as shown. Alternatively, the pump head can mounted on an arm, which can be linearly translated along in the direction of y-axis. The other strips are dye lasers with the CLC host tuned to different wavelengths, $\lambda_1, \lambda_2, \ldots, \lambda_n$. It is clear the organizational scheme for the laser disc is not restricted to the configurations as shown in FIG. 4B. A disc divided into a plurality of zones, each tuned to a different lasing wavelength and a provision for positional decoding are suitable for the dye laser system of the present invention.

The dye laser of the present invention is illustrated in FIGS. 5A, 5B1 and 5B2. FIG. 5A shows a cross-sectional view and FIGS. 5B1 and 5B2 show front views. Conventional longitudinal optical pumping or end pumping, i.e., along the length of the gain medium parallel to the propagation direction of the laser emission, is employed. The pump laser beam 53 and dye laser beam 56 and 56A travel co-linearly within the laser gain medium. As shown in FIG. 5A, the pump beam travels in the direction from left to right, and the dye laser beams emit perpendicularly from film surfaces in both directions. Optics 54 is used to focus the pump beam and optics 57 is used to collimate one of the dye laser outputs, 56. The dye-doped CLC gain medium 55 is typically 5–100 microns thick and dye concentration in the CLC host is typically $10^{-4}$–$10^{-2}$ molar. The optimum dye concentration is influenced by many factors, for example, the pump wavelength, absorption length (orthogonal to the planar direction) of the gain medium at the pump wavelength, the gain and loss of the dye at the laser wavelength. The specific CLC host can also affect the efficiency of the dye laser. Typically, the CLC film is sandwiched between two transparent substrates, 51 and 52. The substrates are chosen with their refractive index close to the average refractive index of the CLC to minimize undesirable optical feedback by Fresnel reflection at the CLC-substrate interfaces. Notably, the substrates for dye laser tapes are flexible. For example, transparent plastics with low birefringence are suitable for such a purpose. The substrates for dye laser discs and cards can be flexible, semi-flexible or rigid. For example, transparent plastics such as polyethylene, the material sold under the trade name MYLAR, and glass are suitable for such purpose. The gain medium 55 is the region where the host CLC is aligned in the so-called planar texture which provides distributed feedback. The lasing wavelength is set by the helical pitch of the CLC host which provides tuning within the emission range of the particular dye being used and can be finely tuned by processing which will be described shortly hereafter. Region 58 surrounding the gain medium 55 may be either of an optically isotropic state, a focal-conic texture which is highly light scattering, or of planar texture which has polarization- and wavelength-selective reflectance. In the event region 58 is provided with a planar texture, it may have a characteristic wavelength which is the same or different from that of the dye laser region 55.

Referring to FIG. 5B1, the pump beam spot 53 (shown as dotted open circle) on the dye laser film is preferably slightly larger (in the planar direction) than the gain medium 55 (shown as shaded solid circle). As shown, the gain medium 55 may take various planar geometries, for example, circular (shown as 55), rectangular (55'), and long rectangular or continuous strip (55"). Various geometrical relationships between the pump beam spot 53 and gain media 55 are illustrated. For the circular or rectangular shaped gain media (55 and 55'), the pump beam is slightly larger in size. Nitrogen and excimer lasers utilized as pump source 2 (FIG. 1) have an output beam of rectangular in shape. As also shown, the same pump pulse may be used to excite two gain media 55 simultaneously. These simultaneously excited gain media may have the same or different output wavelengths. Use of different output wavelengths may be used to effectively provide a laser output having a relatively broader frequency range, as mentioned hereinabove.

Referring FIG. 5B2, pump beam spot 53 is shown on a dye laser film which is in the planar texture in its entirety, so that the entire film comprises gain medium 55. In this instance, the optical pumping zone, also referred to as the laser cavity or dye lasing portion of the film, is defined by the geometrical shape of the pump beam (shown as 53 and 53'). One of the advantages of the present invention is that each dye film laser can be pre-tested or characterized, for example, by determining the quantum efficiency of fluorescence, lasing threshold, lasing efficiency and output wavelength. The laser parameters can be stored as a function of the location on the film. Another advantage is that a dye film laser of specific output wavelength can be conveniently accessed, by moving the pumping beam to a location with the specific output wavelength.

Figure 6:
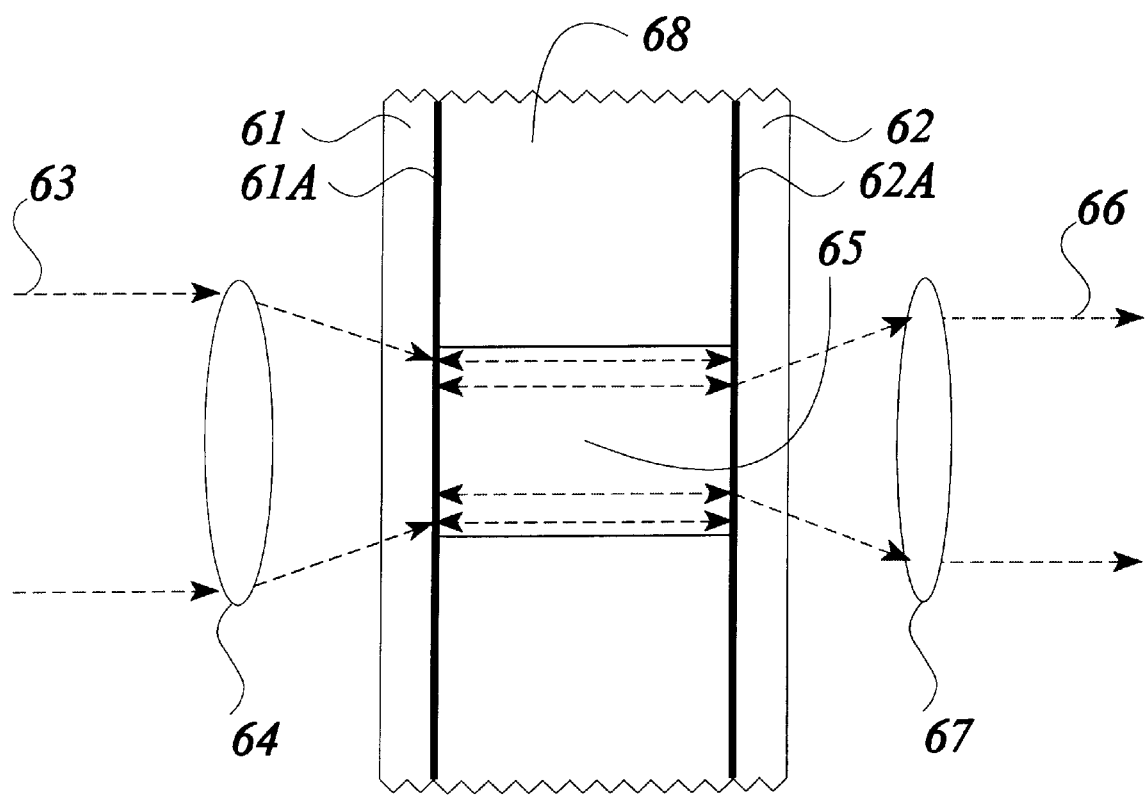
FIG. 6 illustrates another preferred embodiment of the distributed-feedback dye laser of the present invention.

FIG. 6 shows another preferred embodiment of the dye laser system. Longitudinal optical pumping or end pumping is again employed. The pump laser beam 63 and dye laser beam 66 travel co-linearly within the laser gain medium 65. As shown, the pump beam travels in the direction from left to right, and the dye laser beam emits from the film surface in one direction from left to the right. Optics 64 are used to focus the pump beam, while optics 67 are used to collimate one of the dye laser output, 66. A laser dye is embedded in a properly aligned cholesteric liquid crystal host to form the gain medium 65 with distributed feedback provided by the unique chiral structure of the host. The gain medium is typically 5–100 microns long and dye concentration in the host is typically $10^{-4}$–$10^{-2}$ molar. The optimum dye concentration is influenced by many factors, for examples, the pump wavelength, absorption length of the gain medium at the pump wavelength, the gain and loss of the dye at the laser wavelength. The CLC host can also affect the efficiency of the dye laser. Typically, the CLC film is sandwiched between to transparent substrates 61 and 62. The substrate 61 is coated with a reflective coating 61A on the substrate surface facing the dye laser film. Coating 61A is a high-reflectance dichroic coating that reflects substantially at dye laser wavelength but transmits substantially at the pump wavelength. This coating thus tends to force the dye laser output in one direction, thereby improving the laser efficiency. The substrate 62 is coated with a reflective coating 62A on the substrate surface facing the dye laser film. Coating 62A is a high-reflectance dichroic coating and reflects substantially at the pump wavelength but transmits substantially at the dye laser wavelength. The coating thus reflects the un-absorbed pump light back to the dye laser medium, to improve the pumping efficiency and laser efficiency. The specific lasing wavelength, within the spectral range of the particular dye utilized, is set by the helical pitch of CLC host which is determined by the host material and can be finely tuned by processing, as will be discussed in greater detail hereinafter. The region 68 surrounding the gain medium 65 is either of isotropic state which is optically isotropic or of focal-conic texture which is highly scattering or of planar texture which has polarization- and wavelength-selective reflectance. The planar texture of the region 68 has the characteristic wavelength the same or different from that of the dye laser region 65. In addition to the advantages discussed in connection with the embodiment shown in FIG. 5A, additional advantages of this embodiment are that the lasing efficiency is increased as dye laser emission is directed into one direction.

Figure 7:
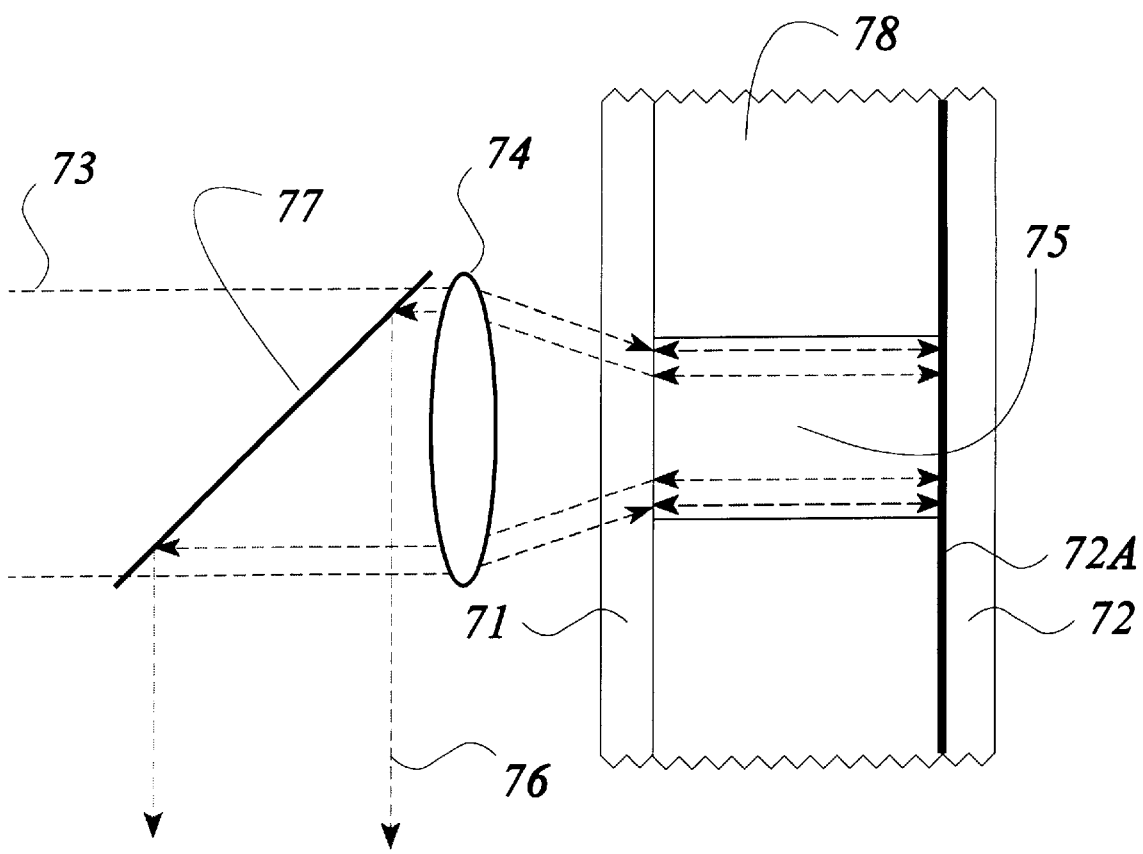
FIG. 7 illustrates another preferred embodiment of the distributed-feedback dye laser of the present invention.

FIG. 7 shows another preferred embodiment of the dye laser system. Longitudinal optical pumping or end pumping is again employed. The pump laser beam 73 and dye laser beam 76 travel co-linearly within the laser gain medium. As shown, the pump beam travels in the direction from left to right, and the dye laser beam emits from the film surface in the direction from right to the left. Optics 74 is used to both focus the pump beam and to collimate the dye laser output. A laser dye is embedded in a properly aligned cholesteric liquid crystal host to form the gain medium 75 with distributed feedback provided by the unique chiral structure of the host. The gain medium is typically 5–100 microns long and dye concentration in the host is typically $10^{-4}$–$10^{-2}$ molar. The optimum dye concentration is influenced by many factors, for examples, the pump wavelength, absorption length of the gain medium at the pump wavelength, the gain and loss of the dye at the laser wavelength. The CLC host can also affect the efficiency of the dye laser. Typically, the CLC film is sandwiched between two transparent substrates 71 and 72. The substrate 72 is coated with a reflective coating 72A on the substrate surface facing the dye laser film. The coating reflects substantially at both the pump and the dye laser wavelengths. A dichroic beamsplitter 77 separates spatially the pump and the dye laser beams. The lasing wavelength, within the spectral range of the dye utilized, is set by the helical pitch of host which is determined by the host material and can be finely tuned by processing. The region 78 surrounding the gain medium 75 is either of isotropic state which is optically isotropic or of focal-conic texture which is highly scattering or of planar texture which has polarization- and wavelength-selective reflectance. The planar texture of the region 78 has the characteristic wavelength same or different from that of the dye laser region 75. In addition to the advantages discussed in connection with the embodiment shown in FIG. 5A, additional advantages include increased lasing efficiency as dye laser emission is directed into one direction. A further advantage is the simplification of optics for focusing the pump beam and collimate the dye laser output beam.

Figure 8A:
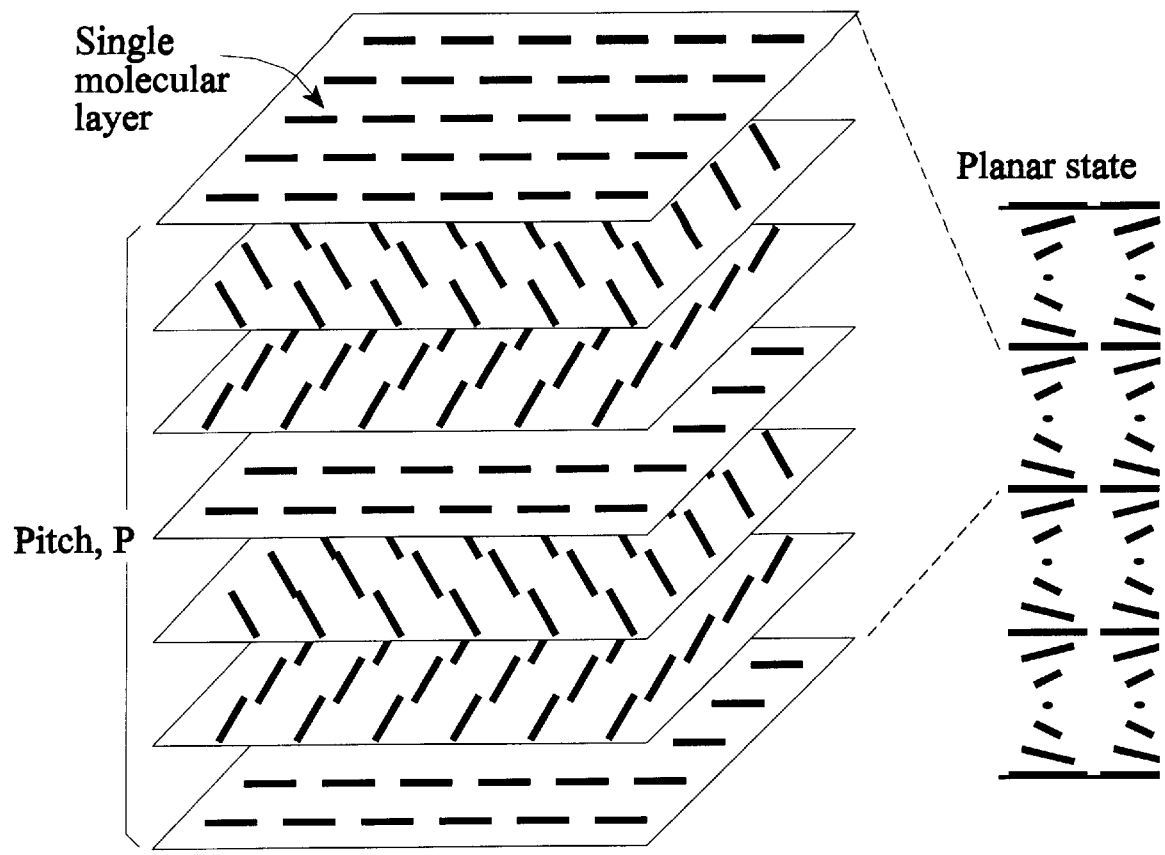
FIG. 8A illustrates the molecular ordering of a CLC in the planar texture for the present invention.

In order to gain insight into the working principle of the present invention, the relevant optical properties of cholesteric liquid crystals are briefly taught. Liquid crystals exist in a phase intermediate between a crystalline solid and an isotropic liquid. The molecules of these compounds are usually rod-shaped with long molecular axes called the directors. Liquid crystal phases are characterized by the long-range arrangement of the molecules. The nematic phase is the simplest, having only orientational ordering such that their directors are approximately parallel. The cholesteric liquid crystal phase originates from the presence of chirality in the nematic phase. FIG. 8A illustrates the molecular ordering for cholesteric liquid crystals. The molecules are arranged in layers of a few angstroms thick. The directors twist about 15 arc minutes in each succeeding layers to form a periodic helical structure with pitch P, as shown. The helical structure can be either right-handed (RH) or left-handed (LH). The helical structures can be aligned normal to the layer boundary as shown, resulting in the so-called the planar texture that exhibits wavelength-selective dichroism which arises from Bragg-type optical interferences. For example, for a RH CLC layer, it reflects right-handed circularly polarized (RHCP) light. The reflectance vs wavelength is discussed by J. -C. Lee and S. D. Jacobs, 'Design and construction of 1064-nm liquid-crystal laser cavity end mirrors,' *Journal of Applied Physics*, 68, 6523 (1990). This relationship is defined by the equation:

$$R = \sin h^2\{\kappa L[1-(\delta/\kappa)^2]^{1/2}\}/\cos h^2\{\kappa L[1-(\delta/\kappa)^2]^{1/2}\} - (\delta/\kappa)^2, \quad [1]$$

where $\delta = 2\pi n_{av}(1/\lambda - 1/\lambda_c)$, $\delta/\kappa = 2(n_{av}/\Delta n)(1-\lambda/\lambda_c)$ and L is by the film thickness. $n_{av}$ is the average index of refraction $(n_e+n_0)/2$ and $\Delta n = n_e - n_0$ is the optical birefringence. $n_e$ and $n_0$ are the refractive indices, respectively, along and perpendicular to the molecular director. For rod-shaped molecules, $n_e > n_0$.

Figure 8B:
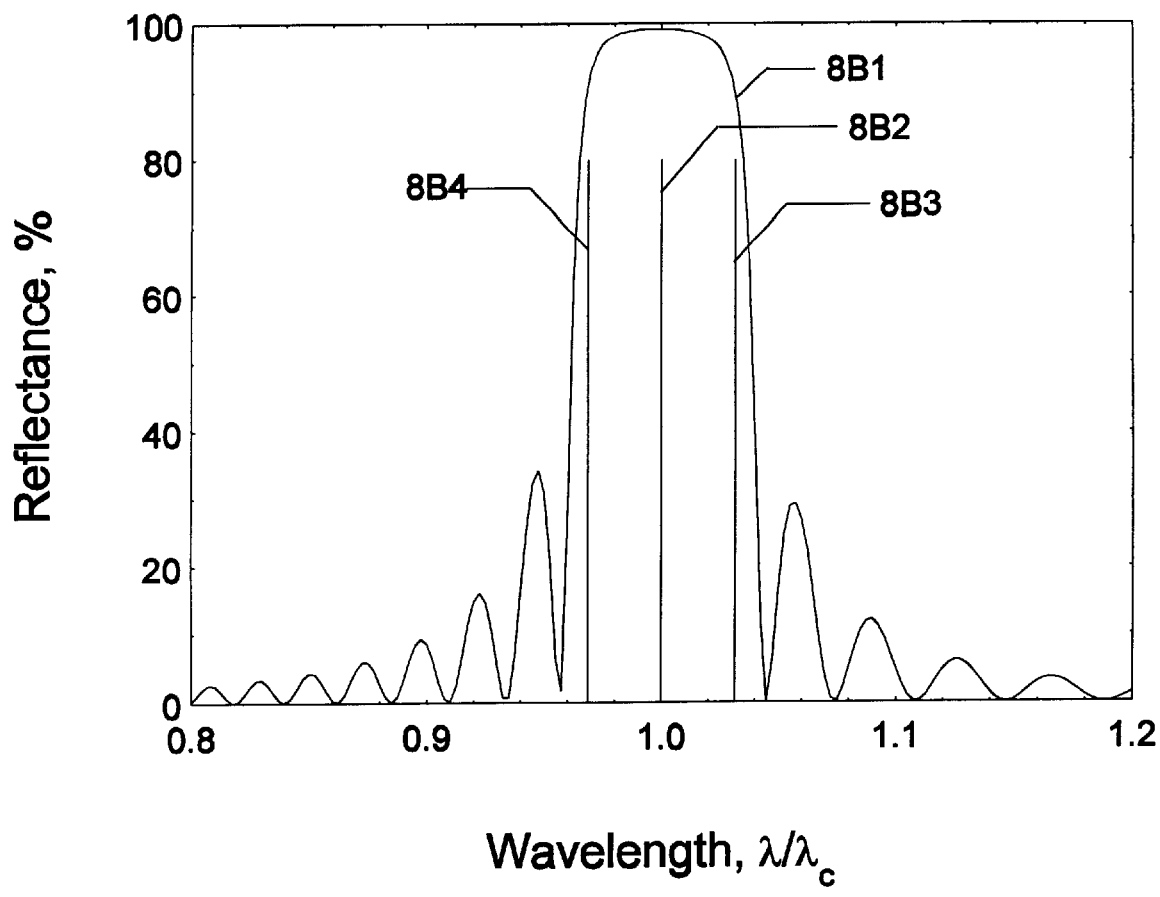
FIG. 8B illustrates a calculated reflectance spectrum for a CLC aligned in the planar texture.

FIG. 8B illustrates a calculated reflectance of a CLC film 8B1 as a function of $\lambda/\lambda_c$. The average index of refraction $n_{av} = 1.60$, birefringence $\Delta n = 0.10$ and the film is 10 pitches thick, L=10P. The values chosen are typical for a polymer CLC. $\lambda_0/\lambda_c = 1 - \Delta n/2n_{av} = n_0/n_{av} = 0.96875$ and $\lambda_e/\lambda_c = 1 + \Delta n/2n_{av} = n_e/n_{ave} = 1.03125$. The wavelength for $\lambda_e$, $\lambda_c$, and $\lambda_0$ in unit of $\lambda_c$ are marked by lines, respectively, 8B2, 8B3 and 8B4. The oscillatory reflectance sidebands is due to out-of-phase Bragg interference. The reflectance has a band $\Delta\lambda$ $$\Delta\lambda/\lambda_c \approx \Delta n/n_{av} \quad [2]$$

centered at the characteristic wavelength $$\lambda_c = n_{av} P \quad [3]$$

The reflectance band is bounded by $\lambda_0 \approx n_0 P$ and $\lambda_e \approx n_e P$, as taught by J. L. Fergason, 'Cholesteric Structure—I. Optical Properties,' *Molecular Crystals*, 1, 293 (1966). The reflectance is almost 100%, if the layer thickness is about 10 pitches, typically about 5 microns for the visible range. In addition, the RH-layer transmits freely left-handed circularly polarized (LHCP) light without absorption, regardless of its wavelength. The converse holds for a left-handed (LH) CLC layer. The liquid crystal in the planar texture is essentially a two-dimensional crystalline structure, as they exhibit optical properties of anisotropic crystals.

The helical structures may be arranged randomly into the so-called focal-conic texture which scatters the incident light. This is illustrated in FIG. 8C1. Cholesteric liquid crystal molecules are ordered to form helical structures 80C1. These structures are randomly oriented between the two substrates, 81C1 and 82C2. Focal-conic texture can be obtained by rapid thermal quenching or no rubbed polyimide layer on the substrates for alignment. At above the so-called clearing temperature, the molecules are not ordered, that is, they are randomly oriented, as in the liquid state. This is illustrated in FIG. 8C2. Cholesteric liquid crystal molecules 80C2 are randomly oriented between the two substrates, 81C2 and 82C2. The material is optically isotropic for the light propagating in any direction.

Refer to FIG. 5A again, the molecular ordering of the planar texture is utilized for the gain medium of the dye laser of the present invention. The planar texture, which provides Bragg-type optical feedback, is used for laser host to produce narrowband laser output. FIG. 5A illustrates that the optical pumping zone or laser cavity is defined by the planar texture of the host, surrounded by the isotropic or focal-conic texture which does not provide optical feedback. Focal-conic texture is preferred because of its inherent light-scattering nature. For the isotropic state, amplified spontaneous emission may be possible if optical gain is very high. As discussed hereinabove, the laser cavity may also be defined by the pump beam geometry, as shown in FIG. 5B1. Because the laser cavity is mirrorless and defined by distributed feedback provided by the cholesteric liquid crystal in the planar texture, this type of laser tends to be insensitive to the alignment of the pump beam. These lasers generally require no alignment by the user and are inherently opto-mechanically stable.

Polymeric cholesteric liquid crystals are particularly suitable as the gain media of the present invention. These are essentially anisotropic glass that exhibits the physical properties of a normal liquid crystal. The system is heated to the desired temperature, polymerization is then initiated with an energy source such as a UV light source to obtain a three-dimensional matrix or network in which the orientation of the molecules and the optical properties of the desired phase are 'frozen in.' While UV light may be preferred, one skilled in the art will recognize that any suitable means for inducing polymerization of the cholesteric liquid crystals may be utilized. Examples of suitable alternatives to UV light may include, for example, use of an electron beam, a blue-light sensitive photo-initiator or simply application of thermal energy. In this regard, activated by external means (UV/visible photons), the monomers of the CLC chemically react with one another to form a polymeric matrix.

With dye in the liquid crystal host, the dye molecules tend to align with their long axis in parallel with the directors of the liquid crystal molecules. The light emission from dye molecules experiences a distributed feedback at the periodicity of $n_0 P = \lambda_0$. Thus, the output wavelength of the dye/CLC laser is given by $$\lambda_L \approx \lambda_0 \approx n_0 P \quad [4]$$

Thus, by changing the helical pitch of the host, the laser output wavelength can be tuned. A liquid crystal of characteristic wavelength $\lambda_c$ can be also be varied by relative mixture of two CLCs according to the following formula described by R. Maurer, D. Andrejewski, F, H. Kreuzer and A. Miller, 'Polarizing color filters made from cholesteric LC silicones,' SID 90 Digest, 110 (1990).

$$1/\lambda_c = c_1/\lambda_{c1} + c_2/\lambda_{c2} \quad [5]$$

where $c_1$ and $c_2$ are the relative concentration of liquid crystals with characteristic wavelengths $\lambda_{c1}$ and $\lambda_{c2}$, respectively. If one of the constituents is nematic liquid crystal, its characteristic wavelength is considered to be infinitely long. Thus, assuming the second liquid crystal is nematic, Eq [5] reduces to:

$$1/\lambda_c = c_1/\lambda_{c1} \quad [5a]$$

For a given CLC polymer, the pitch of the planar texture can be tuned locally by controlling the curing temperature. (R. B. Meyer, F. Lonberg and C. -C. Chang, 'Liquid crystal smart reflectors,' *Proceedings of SPIE*, 2441, 68(1995)). By localized heating to fix helical pitch, a large fractional change in the pitch, $\Delta P/P$ can be obtained. By virtue of Eq [4], a large tuning range in the dye laser output wavelength, $\Delta \lambda_L / \lambda_L \approx \Delta P/P$ can be obtained.

Referring to FIGS. 2C, 3B1, 3B2 and 4B, the zones labeled with characteristic wavelengths $\lambda_1, \lambda_2, \ldots, \lambda_n$, may consist of plurality of dyes in different CLCs which are tuned to different characteristic wavelengths. For example, zones labled with $\lambda_1, \lambda_2$, and $\lambda_3$ are CLC A doped a dye A with laser output wavelength $\lambda_0$ tuned to wavelengths $\lambda_1, \lambda_2$, and $\lambda_3$; zones labled with $\lambda_4, \lambda_5$. and $\lambda_6$ are CLC B doped a dye B with laser output wavelength $\lambda_0$ tuned to wavelengths $\lambda_4, \lambda_5$. and $\lambda_6$ and so on.

Figure 9:
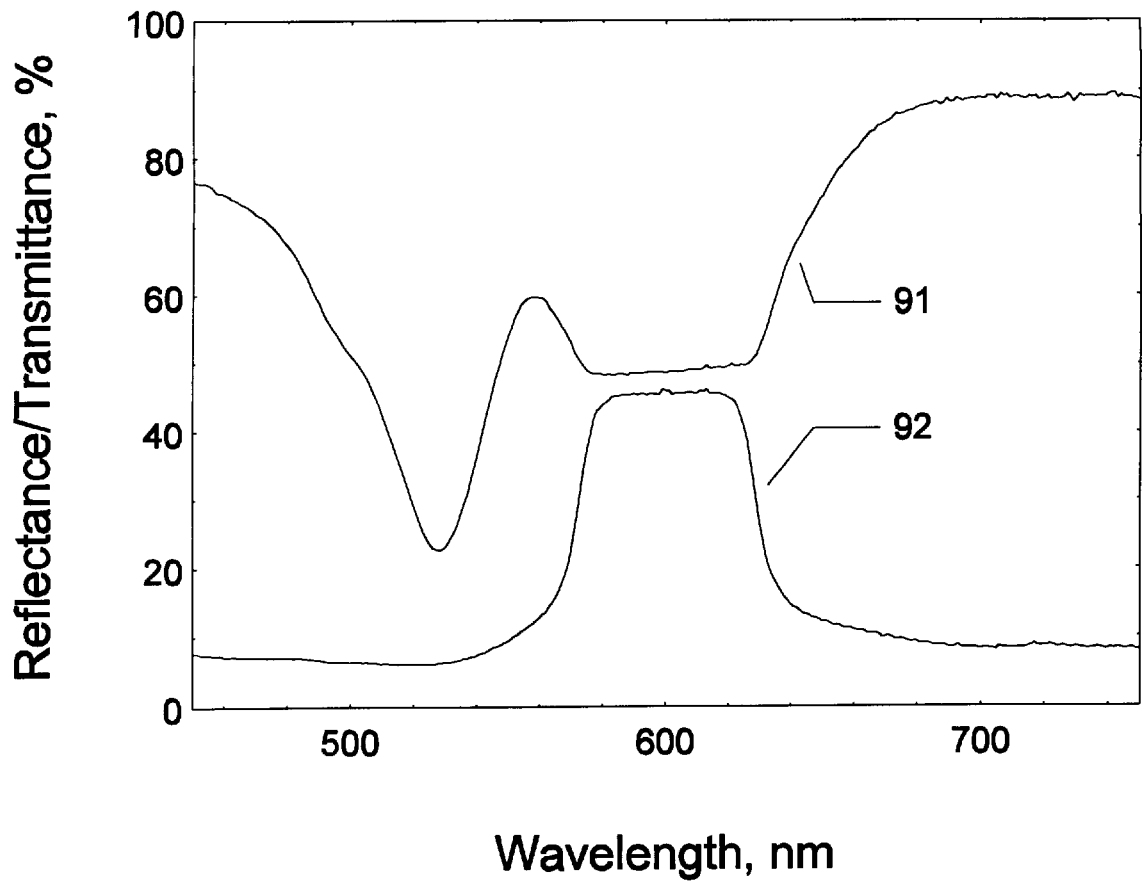
FIG. 9 shows an experimental transmittance and reflectance of a pyrromethene 590-doped RH CLC film for normally incident light.

FIG. 9 shows the transmittance and reflectance of a LH CLC polymer film of 20 microns thick, doped with pyrromethene 590 dye. The transmittance curve 91 for unpolarized incident light displays an absorption band of the laser dye, centered at 530 nm. The transmission at 530 nm is 23%. The second minimum transmittance is at 600 nm and is due to high reflectance of the RHCP light by the CLC. The reflectance curve 92 shows the wavelength- and polarization-selective reflectance of the CLC film. As the incident light is unpolarized, the transmittance at 600 nm is close to the theoretical 50%. As can be seen, with high dye doping concentration, the planar texture of the CLC host is retained.

Advantages of the present invention include utilization of a cholesteric liquid crystal host medium in a substantially solid state form without a need for mirrors or substrates and it can be made in the form of a tape, disks, cards, etc. in such packages as cassettes to make it convenient, low cost, reliable, user friendly. Moreover, the dye laser of the present invention may have multiple tracks. Each track may be doped with a different dye that provides lasing action in a different wavelength band. In this manner, the present invention provides a laser output of relatively wide spectrum, ranging from the UV into the infra-red. The host or gain material may be made of polymer doped with low molecular weight liquid crystal at an amount predetermined to maintain the host material in substantially solid state. This predetermined amount of non-polymerizable low-molecular weight liquid crystal makes it possible to alter the pitch of the helix, such as by varying operating temperature, pressure, or by application of an electric field, such as disclosed in the above-referenced Goldberg patent, or magnetic field as known to those skilled in the art of liquid crystal technology, to effectively fine tune the wavelength of the laser emission. In this manner, the solid state CLC host or gain medium of the present invention is effectively further tuned beyond the relatively course tuning provided by the particular curing temperature utilized as discussed hereinabove.

Figure 10:
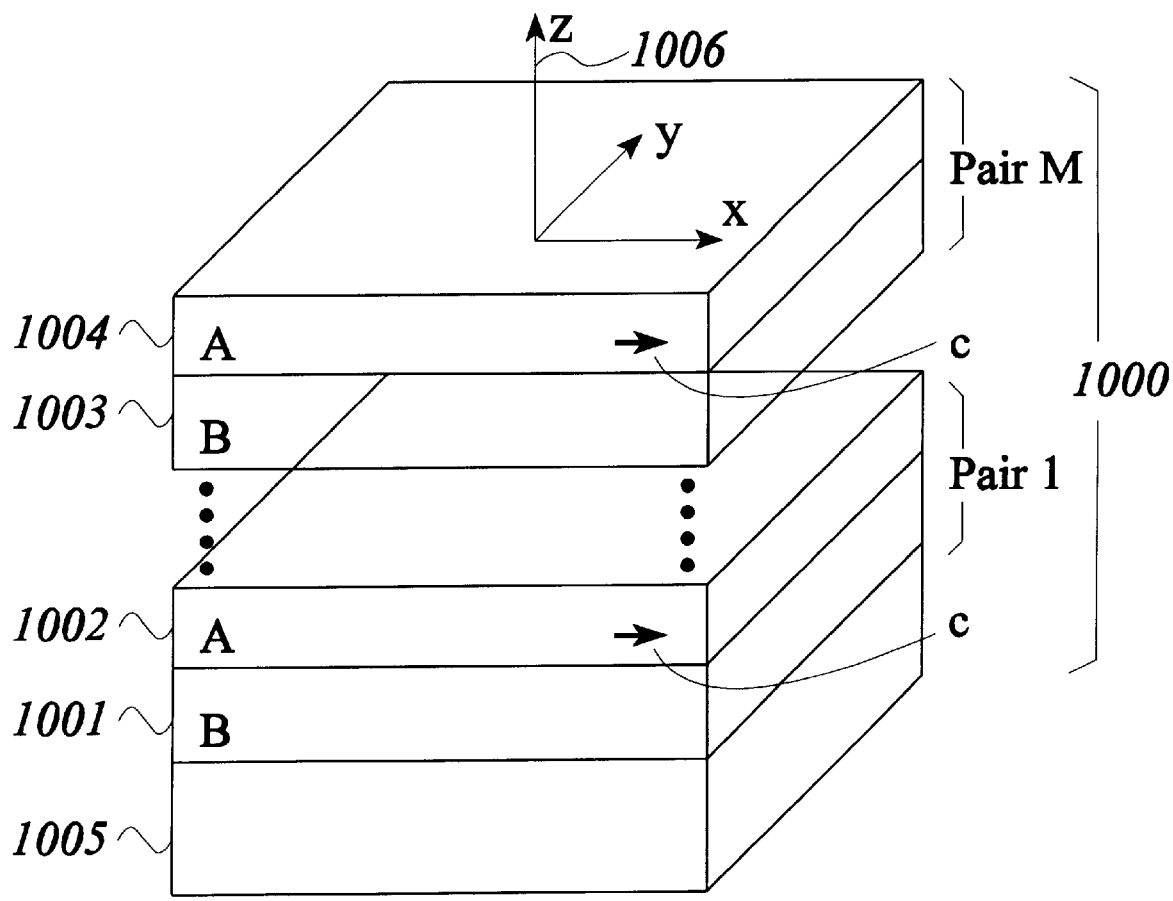
FIG. 10 is a perspective view of an alternate embodiment of the present invention.

The foregoing teaching relates to CLC host which is a stack of birefringent layers, with their optic axes successively rotated about an axis normal to the film plane, forming a helically periodic structure. It is clear that a 'linearly periodic' film stack may also serve as a distributed feedback host of the present invention. Referring to FIG. 10, the 'linearly periodic' host is a stack of thin layer pairs, Pair 1 consisting of layers 1001, 1002, . . . , Pair M consisting of layers 1003 and 1004, disposed on an optional substrate 1005. Layers 1002 and 1004 are of material A with a refractive index $n_A$ and layers 1001 and 1003 are of material B with a refractive index $n_B \neq n_A$. The stack can be represented symbolically ABAB . . . ABs or $[AB]^M S$ where A and B denote, respectively, the layers of material A and material B. s denotes the substrate and M is the number of pairs. The layers are quarter-wave thick, that is, $n_A t_A = n_B t_B = \lambda_c / 4$, where $t_A$ and $t_B$ denote the thickness of layer of material A and B, respectively, and $\lambda_c$ is the characteristic wavelength or center wavelength of the reflectance band of the film stack.

More generally, a linearly periodic structure can be obtained with $t_A/t_B$ fixed and $n_A t_A + n_B t_B = \lambda_c/2$. Either material A or material B or both materials A and B are doped with a laser dye. The characteristic wavelength $\lambda_c$ of the structure is within the fluorescence band of the dye. It is also clear that the basic repeating unit of the stack can be, instead of a pair of two layers, a group of layers, with layer thickness in fixed ratios, ordering and the optical thickness of the group is $\lambda_c/2$. The stack can be represented symbolically ABCABC . . . ABCs or $[ABC]^M$s where A, B and C denote, respectively, the layers with material A, material B and material C. For example, the AB layers may be sublayers which have a combined quarter-wave thickness, with C being the second quarter-wavelength layer. In another example, the ratio of thicknesses of A:B:C may be, for example, 1:1:1, with the thickness of each layer A, B and C=$\lambda_c/6$. s denotes the substrate and M is the number of groups.

One preferred embodiment of the present invention is that layers 1001, 1002, . . . , 1003 and 1004 are optically isotropic. Such structure provides distributed feedback for stimulated emission in a direction normal to the film plane, or the z-axis 1006 as shown. The distributed feedback is polarization-independent. Such structure can be obtained by alternatively spin-coating materials A and B on a substrate. Another preferred embodiment of the present invention is that layer 1001, . . . , 1003 are optically isotropic and layers 1002, . . . , 1004 are optically anisotropic. For the anisotropic layers, the optic axes (indicated by 'c') are parallel to each other, e.g. , along x-axis as shown. The refractive indices of the anisotropic layers along the x and y-axes are $n_{Ax}$ and $n_{Ay}$, respectively, which are different. For a linear periodic structure, $n_B = n_{Ax}$, and $n_{Ay} t_A = n_B t_B = \lambda_c/4$. Such structure provides distributed feedback for stimulated emission in a direction normal to the film plane. The feedback is polarization-dependent, as y-polarized light experiences periodic changes in the refractive index while x-polarized light does not. Such structure can be obtained by first extruding into $[AB]^M$ multilayer and then stretching the resulting multilayer in one direction. The technique is disclosed in a PCT application WO95/17692 by Ouderkirk et al.

The present invention thus overcomes drawbacks associated with prior art devices, including being relatively easy and safe to handle relative to prior liquid dye lasers. Moreover, the present invention overcomes the problem of photodegradation of the laser dyes by providing an inherently stable opto-mechanical alignment for facilitating movement of the gain medium relative to the pump beam. Furthermore, the present invention advantageously provides distributed feedback (DFB) in which the gain medium, laser cavity and wavelength tuning elements are combined into a thin, solid state film for relatively reduced environmental perturbation relative to prior art liquid state approaches.

The foregoing description is intended primarily for purposes of illustration. Although the invention has been shown and described with respect to exemplary embodiments thereof, it should be understood by those skilled in the art that the foregoing and various other changes, omissions, and additions in the form and detail thereof may be made therein without departing from the spirit and scope of the invention.

What is claimed is:

1. A solid state dye laser adapted for use in a solid state dye laser assembly having a pump adapted to emit light at a first frequency and intensity, said solid state dye laser comprising:

a gain medium being in a substantially solid state, and doped with a fluorescent dye adapted to emit light within a predetermined spectral tuning range;

said gain medium being substantially planar at a portion thereof adapted to receive said light from said pump, to define a planar direction, said light adapted for contacting said gain medium at a predetermined angle of incidence relative to said planar direction;

said gain medium having a structure which varies periodically in a direction normal to said planar direction;

said gain medium having location means disposed thereon for locating and orienting said gain medium relative to said pump;

wherein said gain medium is stimulated to emit laser light at an angle relative to said planar direction.

2. The solid state dye laser assembly as set forth in claim 1, wherein said gain medium is stimulated to emit laser light in a direction normal to said planar direction.

3. The solid state dye laser assembly as set forth in claim 1, wherein said periodic structure further comprises a plurality of layers spaced at discrete locations along said normal direction, said plurality of layers having optical properties which vary periodically relative to one another.

4. The solid state dye laser assembly as set forth in claim 1, wherein the first frequency is higher than the frequency of said laser emission.

5. The solid state dye laser as set forth in claim 1, wherein said solid state dye laser comprises an elongated web of a host material.

6. The solid state dye laser as set forth in claim 1, wherein said predetermined angle of incidence is substantially orthogonal to said planar direction.

7. The solid state dye laser as set forth in claim 1, further comprising a pair of surface plates which serve to define front and rear planar surfaces of said gain medium, said pair of surface plates being selectively light reflective and light transmissive.

8. The solid state dye laser as set forth in claim 1, further comprising movement means adapted to move said gain medium relative to said pump.

9. The solid state dye laser as set forth in claim 1, wherein said gain medium is adapted for movement relative to said pump during emission of light from said pump into said gain medium.

10. The solid state dye laser as set forth in claim 1, wherein said gain medium is adapted for movement relative to said pump between emissions of light from said gain medium.

11. The solid state dye laser as set forth in claim 1, wherein said gain medium is adapted to generate laser light within at least one predetermined spectral tuning range.

12. The solid state dye laser as set forth in claim 1, wherein said dye is selected from the group consisting of: DMT dye, BBQ dye, stilbene 420 dye, rhodamine dyes and oxazine dyes.

13. The solid state dye laser as set forth in claim 1, wherein said location means comprises a series of machine readable demarcations disposed along an edge of said gain medium.

14. The solid state dye laser as set forth in claim 1, wherein said gain medium further is tuned to a predetermined characteristic wavelength.

15. The solid state dye laser as set forth in claim 1, wherein said gain medium comprises cholesteric liquid crystal frozen into said characteristic wavelength.

16. The solid state dye laser assembly as set forth in claim 3, wherein said optical properties are selected from the group consisting of:
   orientation of optic axes; and
   refractive indices.

17. The solid state dye laser as set forth in claim 16, wherein said plurality of layers comprise layers of cholesteric liquid crystal.

18. The solid state dye laser as set forth in claim 16, wherein said gain medium further comprises a plurality of birefringent layers superposed over one another;
each one of said plurality of birefringent layers having an optic axis;
said optic axes of each one of said plurality of birefringent layers being substantially parallel; and
an optically isotropic layer disposed between adjacent ones of said plurality of birefringent layers.

19. The solid state dye laser as set forth in claim 16, wherein said gain medium further comprises a plurality of optically isotropic layers superposed with one another;
each one of said plurality of optically isotropic layers having an index of refraction;
said index of refraction of adjacent ones of said plurality of optically isotropic layers being distinct from one another.

20. The solid state dye laser as set forth in claim 18, wherein each one of said plurality of birefringent layers and said optically isotropic layer has a quarter-wave thickness $t=\lambda_0/4$, where $\lambda_0$ is a characteristic wavelength of said gain medium.

21. The light polarizer as set forth in claim 18, wherein at least one of said plurality of birefringent layers is doped with said fluorescent dye.

22. The solid state dye laser as set forth in claim 19, wherein each one of said plurality of optically isotropic layers has a quarter-wave thickness $t=\lambda_0/4$, where $\lambda_0$ is a characteristic wavelength of said gain medium.

23. The solid state dye laser as set forth in claim 19, wherein at least one of said plurality of optically isotropic layers is doped with said fluorescent dye.

24. The solid state dye laser as set forth in claim 5, wherein said gain medium extends throughout said elongated web.

25. The solid state dye laser as set forth in claim 5, further comprising a card.

26. The solid state dye laser as set forth in claim 5, further comprising of an elongated strip adapted for being wound around a capstan wherein rotation of said capstan effects movement of said gain medium relative to said pump.

27. The solid state dye laser as set forth in claim 5, further comprising a substantially circular disc adapted to rotate about a central axis thereof to effect said movement.

28. The solid state dye laser as set forth in claim 5, wherein said gain medium further comprises cholesteric liquid crystal.

29. The solid state dye laser as set forth in claim 28, wherein said gain medium comprises polymeric cholesteric liquid crystal frozen into a characteristic wavelength.

30. The solid state dye laser as set forth in claim 28, wherein said cholesteric liquid crystal is disposed in one state selected from the group consisting of a gel and a solid.

31. The solid state dye laser as set forth in claim 29, wherein molecules comprising said polymeric cholesteric liquid crystal are disposed in a planar texture.

32. The solid state dye laser as set forth in claim 31, wherein said gain medium extends coextensively with said elongated web.

33. The solid state dye laser as set forth in claim 7, wherein said front plate is substantially transparent to light of said first frequency and substantially reflective to said laser emission.

34. The solid state dye laser as set forth in claim 7, wherein said rear plate is substantially transparent to said laser emission and substantially reflective to light of said first frequency.

35. The solid state dye laser as set forth in claim 7, wherein said gain medium comprises cholesteric liquid crystal in a gel state disposed between said plates.

36. The solid state dye laser as set forth in claim 33, wherein said front plate further comprises: a multi-layer coating having a reflectance band adapted to substantially transmit light of said first frequency and substantially reflect said laser emission.

37. The solid state dye laser as set forth in claim 34, wherein said rear plate comprises a multilayer coating having a reflectance band adapted to substantially transmit said laser emission and substantially reflect light of said first frequency.

38. The solid state dye laser as set forth in claim 8, wherein said angle of incidence remains substantially constant throughout said movement.

39. The solid state dye laser as set forth in claim 38, wherein said movement further comprises movement of said gain medium in said planar direction relative to said pump.

40. The solid state dye laser as set forth in claim 11, wherein said at least one predetermined spectral tuning range is provided by said dye.

41. The solid state dye laser as set forth in claim 11, wherein said gain medium comprises a plurality of discrete portions each adapted to generate laser light within a plurality of discrete spectral tuning ranges.

42. The solid state dye laser as set forth in claim 41, wherein each of said plurality of discrete portions comprises a discrete dye.

43. The solid state dye laser as set forth in claim 42, wherein each of said discrete dyes is selected from the group consisting of: DMT dye, BBQ dye, stilbene 420 dye, rhodamine dyes and oxazine dyes.

44. The solid state dye laser as set forth in claim 13, wherein said location means comprises a series of perforations.

45. The solid state dye laser as set forth in claim 13, wherein said location means comprises a series of magnetic tags.

46. The solid state dye laser as set forth in claim 14, wherein said gain medium is tuned by exposure to an energy source.

47. The solid state dye laser as set forth in claim 14, wherein said gain medium is adapted for further tuning by adjusting operating temperature thereof.

48. The solid state dye laser as set forth in claim 14, wherein said gain medium is adapted for further tuning by adjusting operating electromagnetic field thereof.

49. The solid state dye laser as set forth in claim 14, wherein said gain medium is adapted for further tuning by adjusting operating pressure thereof.

50. The solid state dye laser as set forth in claim 14, wherein said gain medium comprises a plurality of regions each tuned to one of a plurality of discrete characteristic wavelengths.

51. The solid state dye laser as set forth in claim 46, wherein said energy source is selected from the group consisting of light, electron beam bombardment and thermal energy.

52. The solid state dye laser as set forth in claim 50, wherein said gain medium comprises cholesteric liquid crystal disposed in a gel state.

53. The solid state dye laser as set forth in claim 50, wherein each of said plurality of regions extends in said planar direction in a geometric configuration selected from the group consisting of linear tracks, circular tracks, or wedges.

54. The solid state dye laser as set forth in claim 53, wherein said gain medium further comprises location means disposed thereon for locating and orienting a selected one of said plurality of regions for receipt of said light emitted from said pump.

55. The solid state dye laser as set forth in claim 15, wherein said gain medium comprises polymeric cholesteric liquid crystal.

56. The solid state dye laser as set forth in claim 15, wherein molecules comprising said cholesteric liquid crystal are disposed in a planar texture.

57. The solid state dye laser as set forth in claim 15, wherein said gain medium is bounded in said planar direction by cholesteric liquid crystal disposed in a planar texture.

58. The solid state dye laser as set forth in claim 15, wherein said gain medium is bounded in said planar direction by cholesteric liquid crystal disposed in a focal-conic texture.

59. The solid state dye laser as set forth in claim 15, wherein said gain medium is bounded in said planar direction by cholesteric liquid crystal molecules randomly oriented to define an isotropic state.

60. A solid state dye laser assembly comprising:
   a solid state dye laser including a gain medium including polymeric liquid crystal being in a substantially solid state and doped with a fluorescent dye adapted to emit light with in a predetermined spectral tuning range;
   a pump adapted to emit light at first frequency and intensity into said gain medium to stimulate laser emission from said gain medium;
   said gain medium being adapted for movement relative to said pump, and said gain medium having location means disposed thereon for locating and orienting said gain medium relative to said pump.

61. A solid state dye laser adapted for use in a solid state dye laser assembly having a pump adapted to emit light at a first frequency and intensity, said solid state dye laser comprising:
   an elongated web of polymeric host material having a gain medium disposed therein, said gain medium being in a substantially solid state and doped with a fluorescent dye adapted to emit light within a predetermined spectral tuning range;
   said gain medium including polymeric cholesteric liquid crystal disposed in a planar texture and frozen into a characteristic wavelength;
   said gain medium being adapted for movement relative to said pump, and said gain medium having location means disposed thereon for locating and orienting said gain medium relative to said pump.

62. A solid state dye laser adapted for use in a solid state dye laser assembly having a pump adapted to emit light at a first frequency and intensity, said solid state dye laser comprising:
   a gain medium being in a substantially solid state, and doped with a fluorescent dye adapted to emit light within a predetermined spectral tuning range;
   said gain medium being substantially planar at a portion thereof adapted to receive said light from said pump, to define a planar direction, said light adapted for contacting said gain medium at a predetermined angle of incidence relative to said planar direction;
   said gain medium having a structure which varies periodically in a direction normal to said planar direction;
   said periodic structure including a plurality of birefringent layers superposed over one another;
   each one of said plurality of birefringent layers having an optic axis;
   said optic axes of each one of said plurality of birefringent layers being substantially parallel; and
   an optically isotropic layer disposed between adjacent ones of said plurality of birefringent layers;
   wherein said gain medium is stimulated to emit laser light at an angle relative to said planar direction.

63. A solid state dye laser adapted for use in a solid state dye laser assembly having a pump adapted to emit light at a first frequency and intensity, said solid state dye laser comprising:
   a gain medium being in a substantially solid state, and doped with a fluorescent dye adapted to emit light within a predetermined spectral tuning range;
   said gain medium being substantially planar at a portion thereof adapted to receive said light from said pump, to define a planar direction, said light adapted for contacting said gain medium at a predetermined angle of incidence relative to said planar direction;
   said gain medium having a structure which varies periodically in a direction normal to said planar direction;
   said periodic structure including a plurality of optically isotropic layers superposed with one another;
   each one of said plurality of optically isotropic layers having an index of refraction;
   said index of refraction of adjacent ones of said plurality of optically isotropic layers being distinct from one another;
   wherein said gain medium is stimulated to emit laser light at an angle relative to said planar direction.

64. A solid state dye laser adapted for use in a solid state dye laser assembly having a pump adapted to emit light at a first frequency and intensity, said solid state dye laser comprising:
   a gain medium being in a substantially solid state, and doped with a fluorescent dye adapted to emit light within a predetermined spectral tuning range;
   said gain medium being substantially planar at a portion thereof adapted to receive said light from said pump, to define a planar direction, said light adapted for contacting said gain medium at a predetermined angle of incidence relative to said planar direction;
   said gain medium having a structure which varies periodically in a direction normal to said planar direction;
   said periodic structure including a plurality of discrete layers superposed with one another;
   at least one of said plurality of discrete layers being fabricated from a material that is distinct relative to that of an other of said discrete layers;
   wherein said gain medium is stimulated to emit laser light at an angle relative to said planar direction.

* * * * *